June 12, 1962 C. R. ROCHE 3,038,353
AUTOMATIC TRANSMISSION
Filed Aug. 14, 1953 10 Sheets-Sheet 1
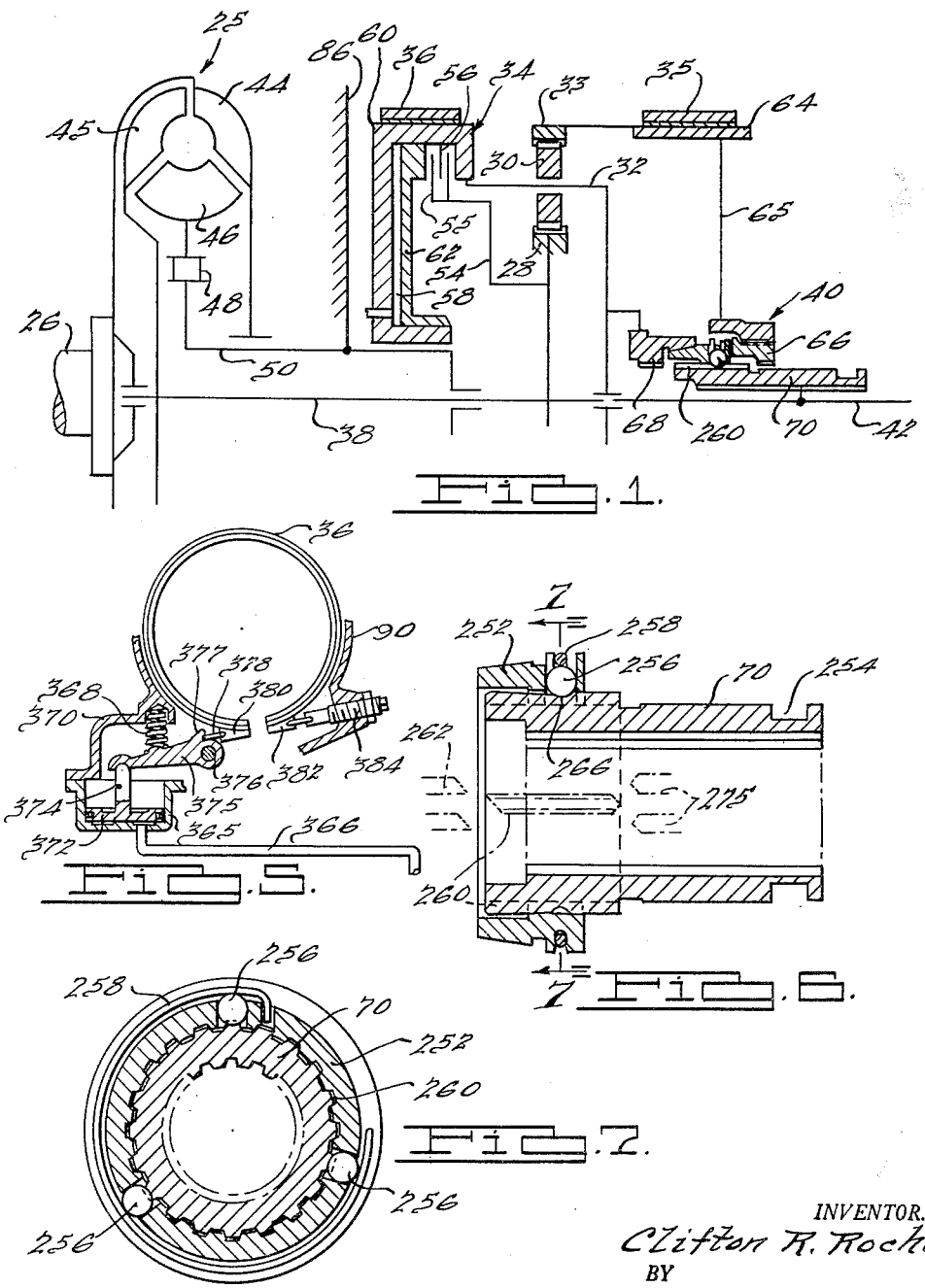
INVENTOR.
Clifton R. Roche.
BY
Harness, Dickey & Pierce
ATTORNEYS.

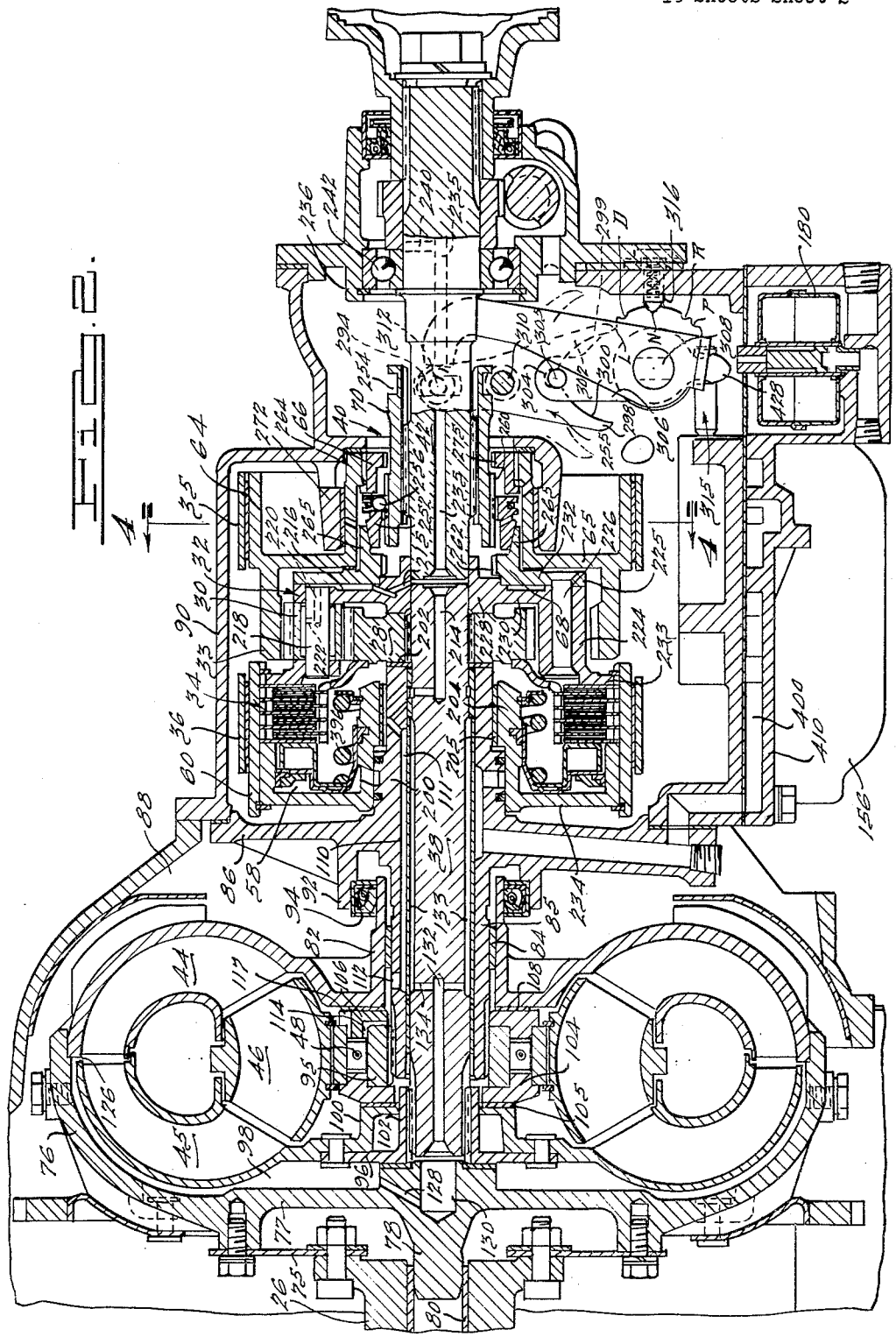

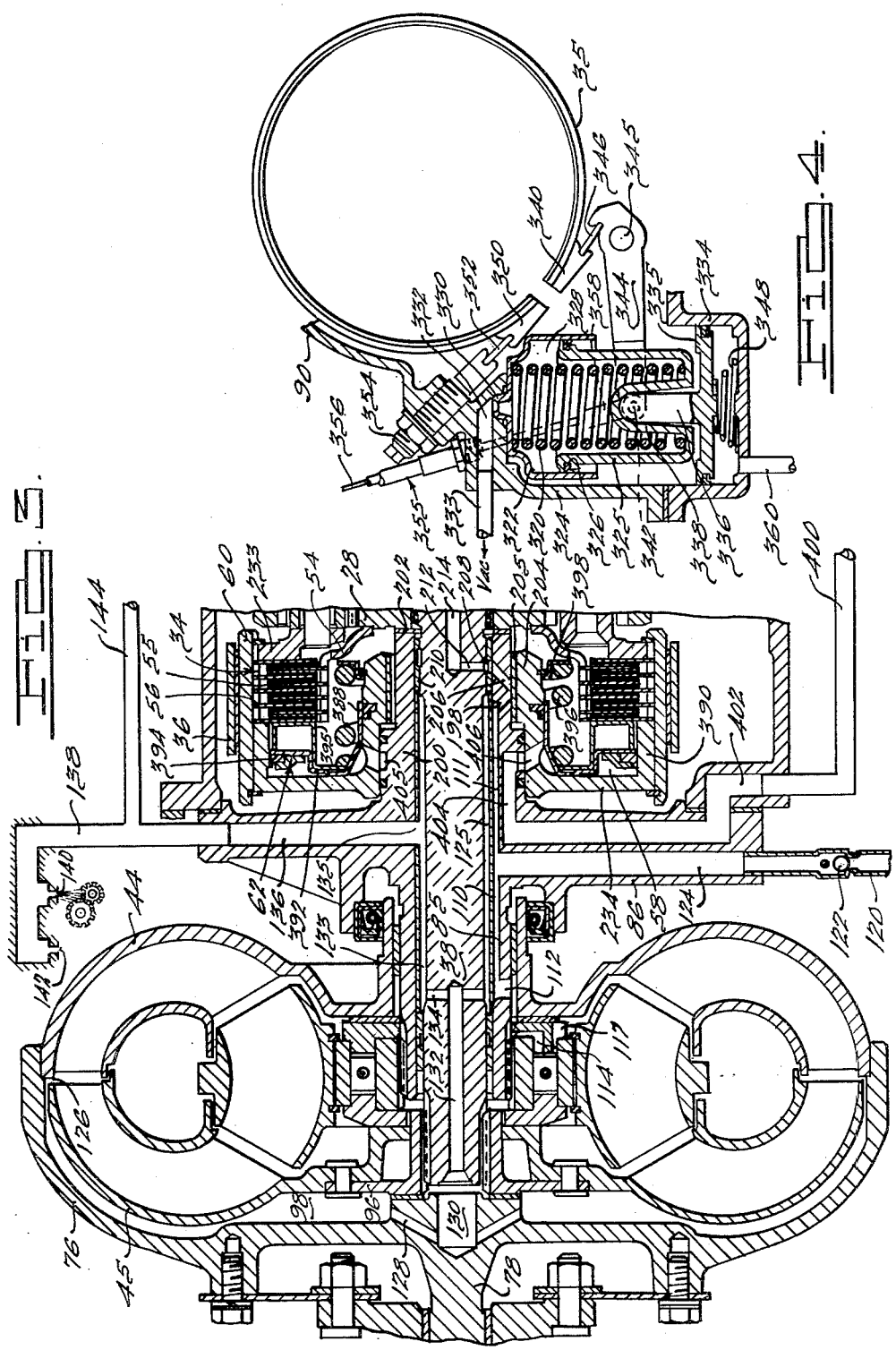

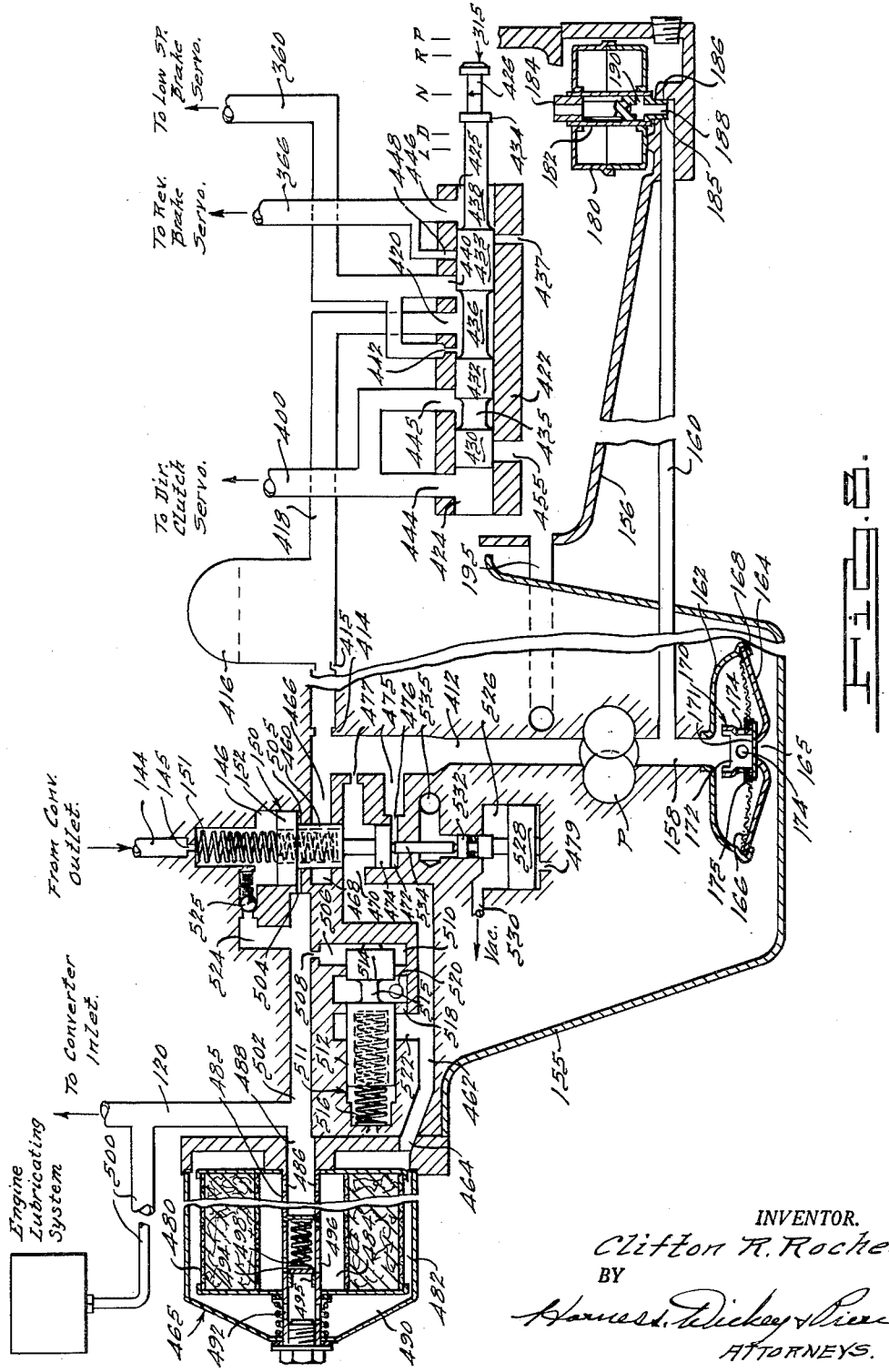

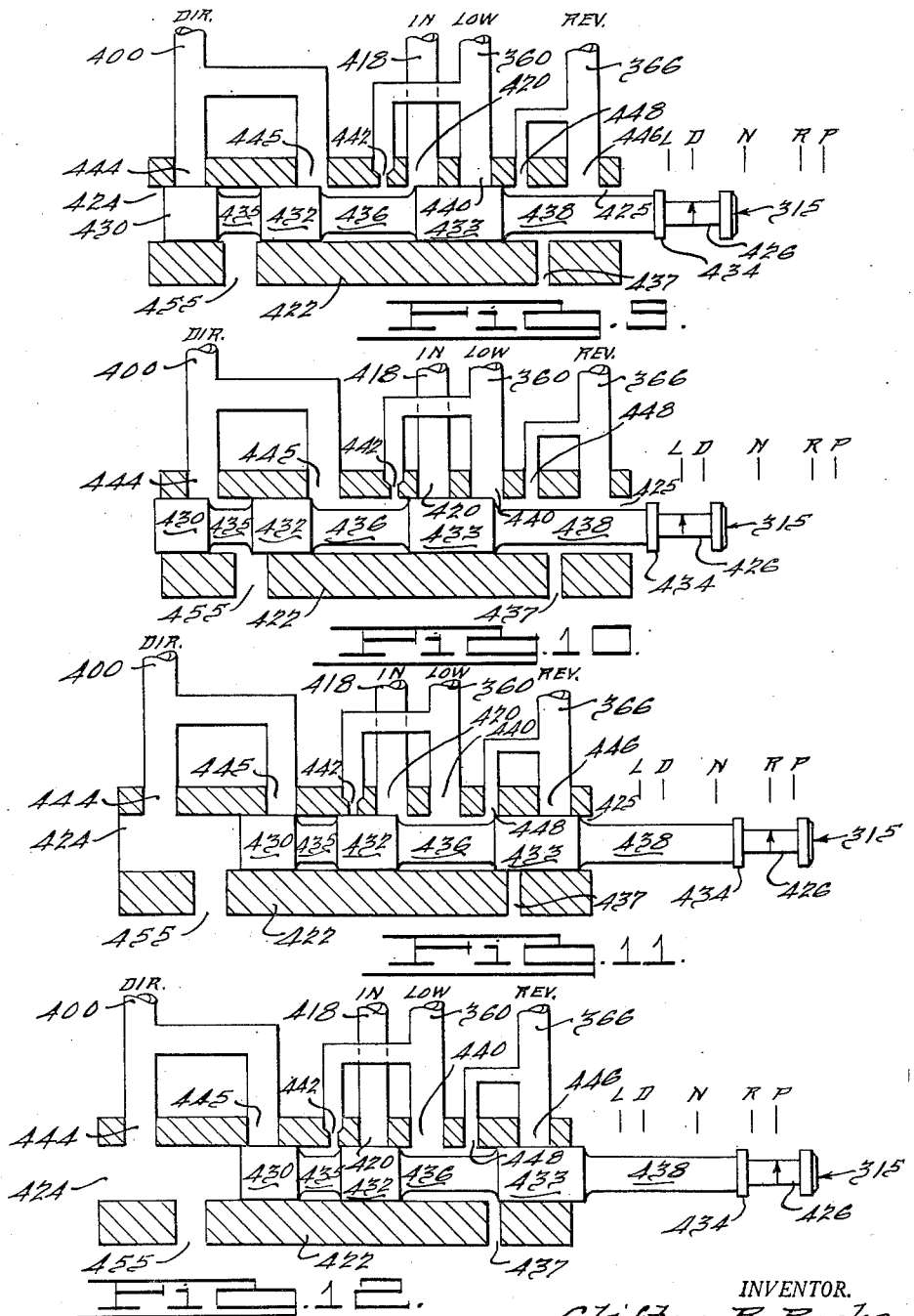

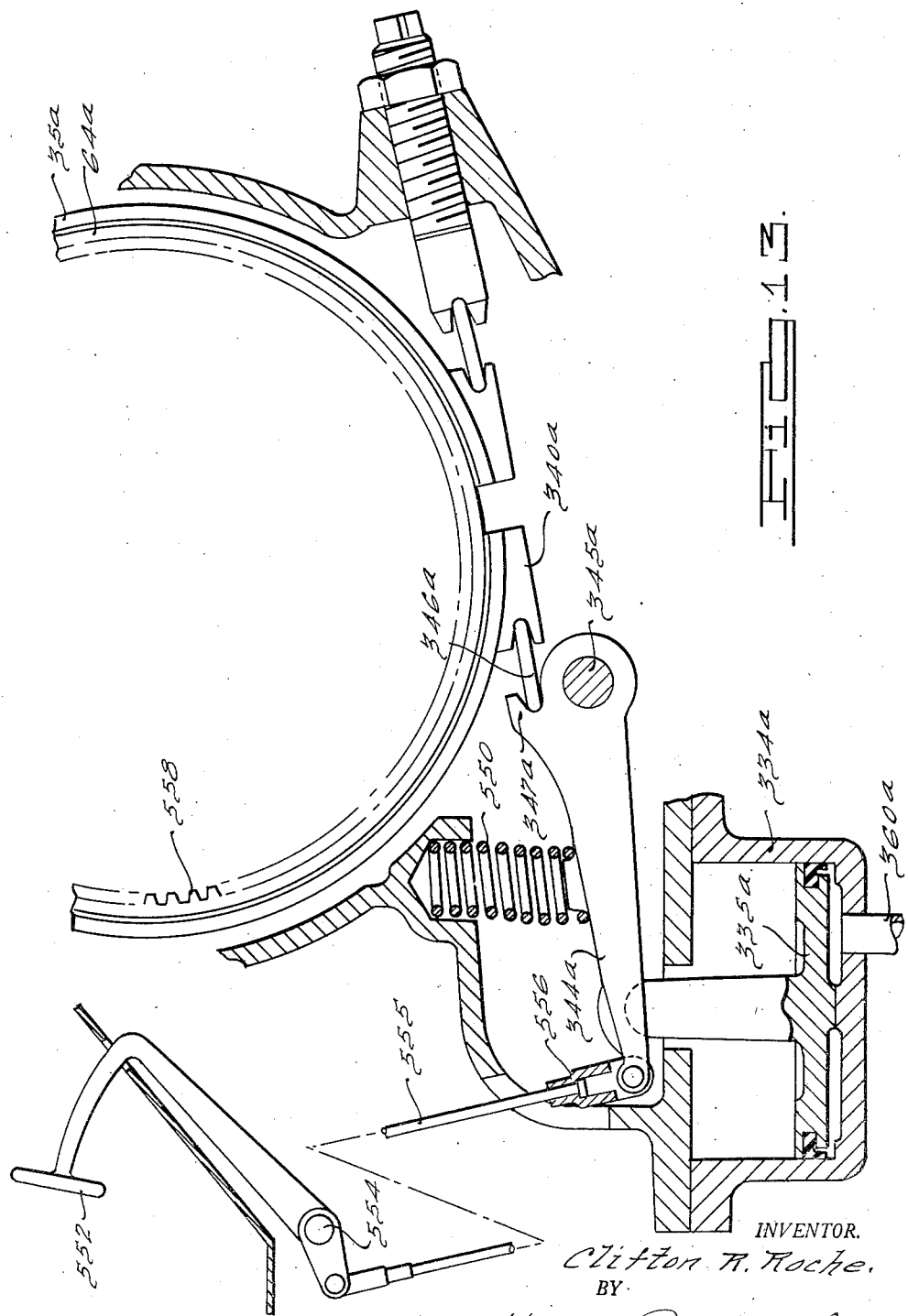

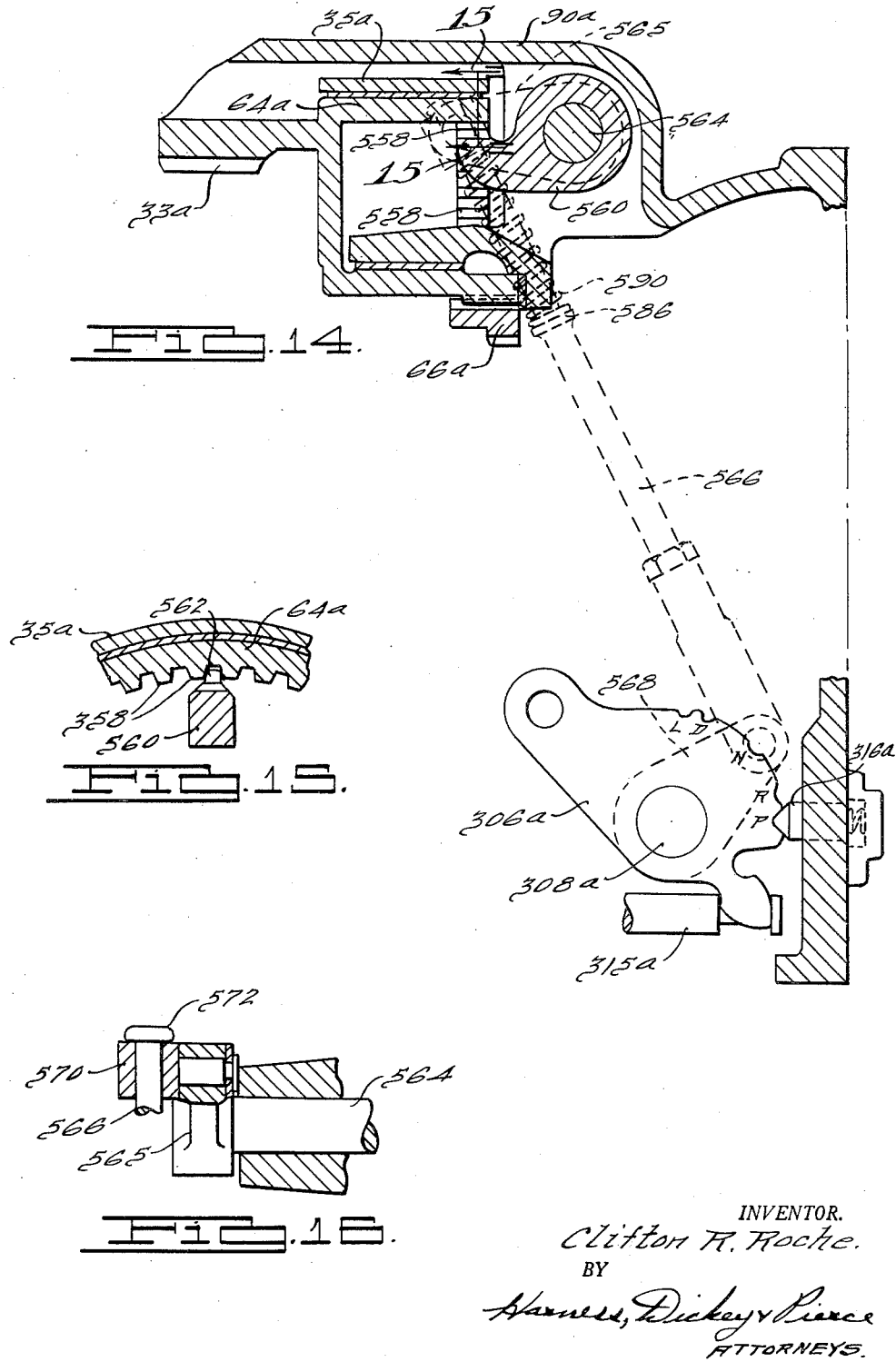

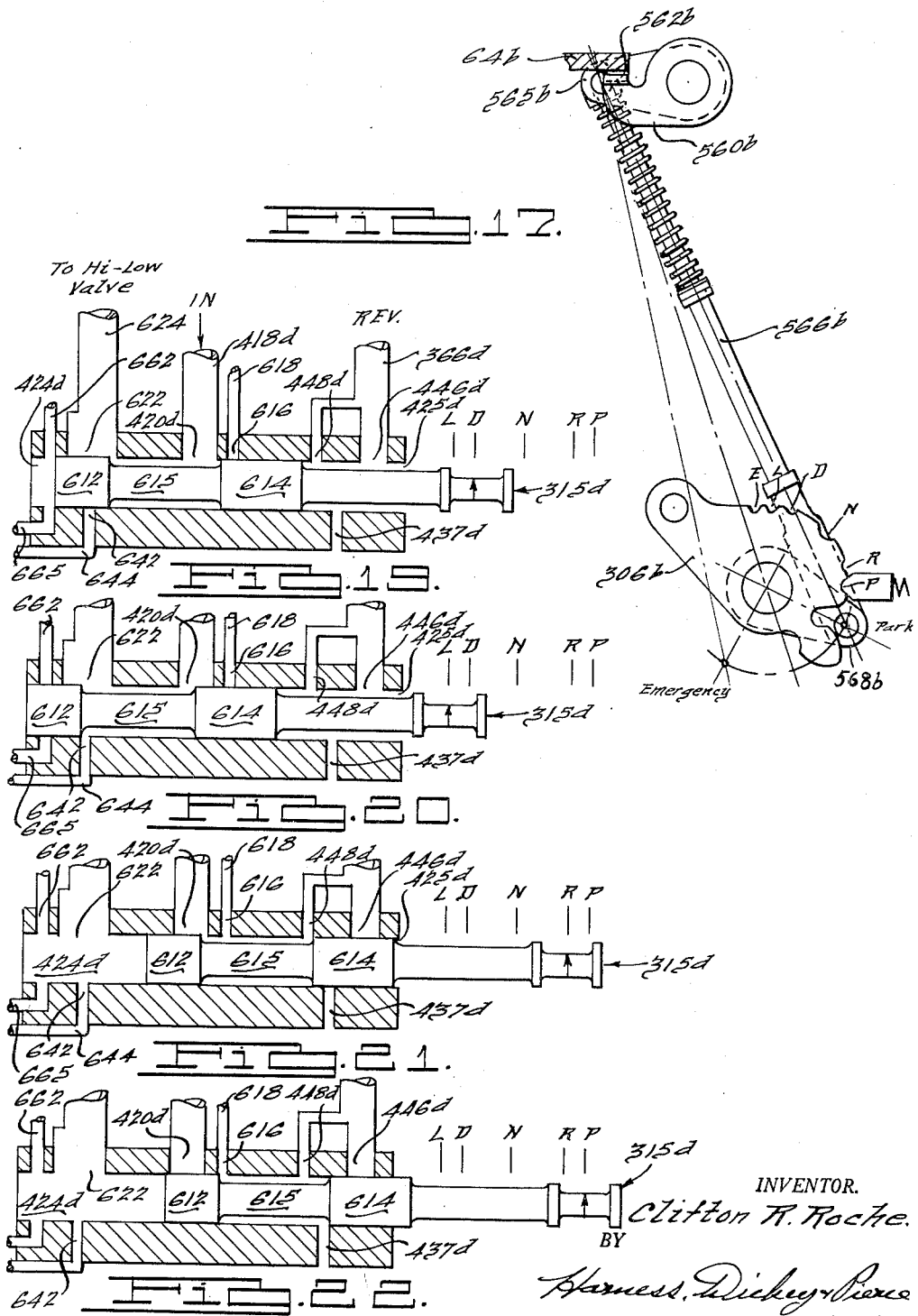

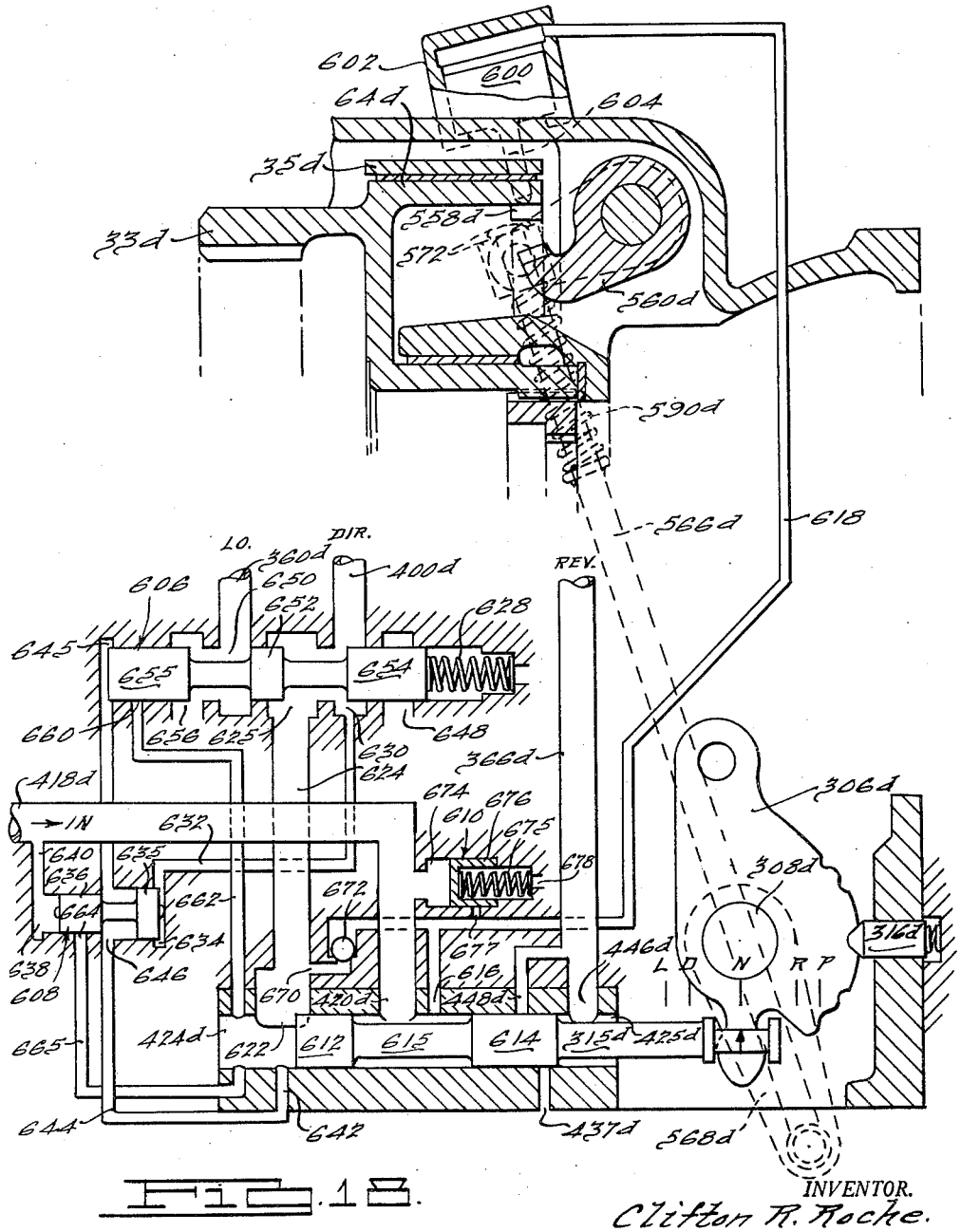

June 12, 1962 C. R. ROCHE 3,038,353
AUTOMATIC TRANSMISSION
Filed Aug. 14, 1953 10 Sheets-Sheet 10

INVENTOR.
Clifton R. Roche.
BY
Harness, Dickey & Pierce
ATTORNEYS.

United States Patent Office 3,038,353
Patented June 12, 1962

3,038,353
AUTOMATIC TRANSMISSION
Clifton R. Roche, 101 S. Sycamore Ave.,
Los Angeles 36, Calif.
Filed Aug. 14, 1953, Ser. No. 374,323
30 Claims. (Cl. 74—730)

This invention relates to automatic transmissions, and particularly to improved and simplified controlling means therefor, constituting an improvement upon the disclosure of my copending application, Serial No. 189,981 filed October 13, 1950, now Patent No. 2,747,431, issued May 29, 1956.

An important object of the invention is to provide, in combination with an automatic transmission incorporating a hydraulic torque converter and friction clutching and/or braking means for controlling the drive through the transmission, improved means responsive to the torque multiplication in the torque converter for varying the engaging pressure applied to such braking and/or clutching means.

An object related to that last stated is to provide improved modulating means, responsive to changes in the pressure differential obtaining between the fluid inlet and the fluid outlet of the torque converter, to control the engaging pressure of the clutching and/or braking means of a transmission of the indicated variety.

Still another object is to provide an improved transmission system of the indicated character containing gearing and a hydraulic torque converter of the Foettinger type, and hydraulically actuatable friction members for regulating the action of the gearing, the transmission being adapted for installation in a motor vehicle driven by an engine having a forced feed lubrication system, and wherein oil for the torque converter, oil for actuation of the friction members, and oil for lubrication of the transmission, may all be derived from, and pressurized by, the forced feed lubrication system of the engine, and wherein the pressure of the oil delivered to the several components mentioned is modulated and controlled in a unique manner in accordance with the functions to be performed thereby and in accordance with differences in the operating conditions to which the vehicle is subjected.

A related object is to provide novel pressure modulating means for a transmission and control system of the indicated variety so arranged that the oil pressure is so controlled in its delivery to servo motors which actuate the transmission clutches and transmission brake means as to insure smooth, lurch-free engagement of such clutches and brake means, under all driving conditions.

A further object is to provide such a system which is low in cost, simple and trouble-free in construction and in operation, and which is so designed that a lesser proportion of the torque delivered by the engine is consumed in pressurizing the oil and in actuating the servo motors than is usually required, whereby more of the engine output is available for driving the vehicle, and whereby less heat is generated in the oil, and smoother operation is achieved.

Another object of the invention is to provide an integrated hydraulic actuating and control system and lubricating system for an engine-transmission installation, incorporating a full flow oil filter and having improved means for controlling the pressure of the oil which is delivered, after passing through the filter, to the torque converter and to the engine lubricating system, the pressure of the lubricant supplied to the oil filter inlet being regulated, in accordance with the pressure of the oil delivered from the filter outlet, by a valve which dumps any excess oil not required to maintain proper pressure in the filter outlet into the engine pan before such oil passes through the filter. Important advantages are derived from such improved pressure control arrangement, including the following: (1) A constant desired pressure is maintained in the oil delivery system to the engine and to the torque converter, and also in the modulated pressure system, regardless of the condition of the filter. (2) Inasmuch as the valve is actuated by the oil which has passed through the filter, the damping action of the filter eliminates any tendency of such valve to vibrate. (3) Filters last longer, because the pressure which is effective to force the oil through the filter increases as the filter clogs, and the automatic by-pass valve of the filter can be set to open at a higher pressure.

Another object is to provide an improved system of the indicated character having unique and simple pressure modulating means for the hydraulic control and actuating system of the transmission. A related object is to provide such modulating means which is uniform and reliable in its action under all operating conditions, and the action of which is governed by the combined influence of the relative torque demand upon the engine and the torque multiplication of the hydraulic torque converter.

Still another object is to provide an improved integrated system fed from a single oil pump driven by the engine, for supplying oil for lubrication of the engine, and for lubrication of all transmission components, and also for actuating and governing the action of certain transmission components.

An object related to that last stated is to provide such an integrated system incorporating two oil sumps, one in the engine and one in the transmission, such oil sumps being interconnected in a novel manner and by at least two interconnecting passages, one such passage being located below the oil level in both sumps and another of such passages being located at a level which corresponds to a desired maximum oil level, means being provided whereby the pump will draw oil from either one sump or the other, as may be desirable at different times, but the pump cannot draw air from either sump. A related object is the provision of means whereby oil may also, under certain conditions, flow by gravity from one sump to the other, so that in event of sticking or failure of the means which controls the admission of oil from the sumps to the pump, adequate oil will be supplied to the pump to maintain proper operation of the system.

Still another object is to provide an engine-transmission oiling and hydraulic actuating and control system of the indicated variety which accommodates a larger volume of oil than do conventional engine oiling systems, and all of the oil in which is available for lubrication of the engine, thereby reducing the frequency of necessary service oil changes.

A further object is to provide such an installation which requires only a single oil pump to take care of all of the requirements of both the engine and transmission, thereby reducing cost and eliminating the loss of power which occurs in driving two or three oil pumps, such as are employed in many systems.

Still another object is to provide such a system wherein only one filter and one oil inlet strainer are required.

Still another object is to provide such a system which attains improved control of oil temperature, and which utilizes the heating effect of the torque converter to reduce the period required to warm up the oil in cold starting, and which further is so arranged that in hard fast road driving the tendency to overheat the oil is reduced, because of the fact that the converter, which is not then multiplying the torque, acts as on oil cooler, maintaining the oil at a lower and better operating temperature. This effect is augmented by the increased volume of oil. It will be appreciated that the improved control of oil temperature in this manner is conducive both to increased engine life and to better engine performance and increased efficiency in the utilization of fuel.

Still another object is to provide, in a transmission of the indicated character, improved means for actuating the low speed reaction brake of the transmission under the combined influence of modulated hydraulic pressure and the pressure in the intake manifold of the engine.

Another object is to provide improved transmission braking mechanism including a hydraulically operable friction-type brake which is biased to the off position, and a latch-type brake acting to hold the same part which is held by the friction brake, the latch-type brake serving as a parking brake and also to enable starting the engine when no oil pressure is available to actuate the friction brake. Another object is to provide improved controlling means including novel means for controlling the action of such a dual braking mechanism.

Still another object is to provide improved timing of shifting between different gear ratios.

Other objects and advantages of the invention will become apparent upon consideration of the present disclosure in its entirety.

In the drawings:

FIGURE 1 is a diagrammatic view of the principal mechanical components of a transmission constructed in accordance with certain principles of my present invention and adapted to be controlled by controlling means incorporating further principles of the present invention;

FIG. 2 is a substantially central vertical sectional view of such a transmission;

FIG. 3 is a view similar to FIG. 2 showing the front portion only of such a transmission, with certain parts shown on different planes of section, and diagrammatically illustrating some of the oil passages;

FIG. 4 is a transverse section taken substantially on the line 4—4 of FIG. 2, but on a reduced scale, showing the actuating means for the low speed brake band;

FIG. 5 is a similar view, on a still smaller scale, showing the reverse reaction brake band and its actuating means;

FIG. 6 is a longitudinal substantially diametric sectional view of a part of the forward-neutral-reverse clutching means;

FIG. 7 is a cross-sectional view taken substantially on the line 7—7 of FIG. 6;

FIG. 8 is a diagrammatic view with certain parts in section showing principal components of the fluid supply and control system;

FIG. 9 is a sectional view of the selector valve showing the same in the "drive" position;

FIG. 10 is a similar view showing the selector valve in the "low" position;

FIG. 11 is a similar view of the selector valve in the "reverse" position;

FIG. 12 is a similar view showing the selector valve in the "park" position;

FIG. 13 is a cross-sectional view of a modified low speed reaction brake mechanism, and actuating means therefor;

FIG. 14 is a longitudinal sectional view showing further modified braking means of the latch type, adapted to be used in conjunction with the modified braking structure of FIG. 13;

FIG. 15 is a sectional detail taken substantially on the line 15—15 of FIG. 14 and looking in the direction of the arrows;

FIG. 16 is a sectional detail showing the means for connecting the actuating rod to the latch brake shaft;

FIG. 17 is a partially diagrammatic view on a smaller scale showing a further modified arrangement of the principal components illustrated in FIGS. 14, 15 and 16;

FIG. 18 is a diagrammatic view showing a control system and associated mechanical components, depicting a further modification;

FIG. 19 is a view of the selector valve employed in the embodiment of FIG. 18, showing the valve in the "drive" position;

FIG. 20 is a similar view showing such selector valve in the "low" position;

FIG. 21 is a similar view showing such selector valve in the "reverse" position;

FIG. 22 is a similar view showing such selector valve in the "park" position.

Figure 23:
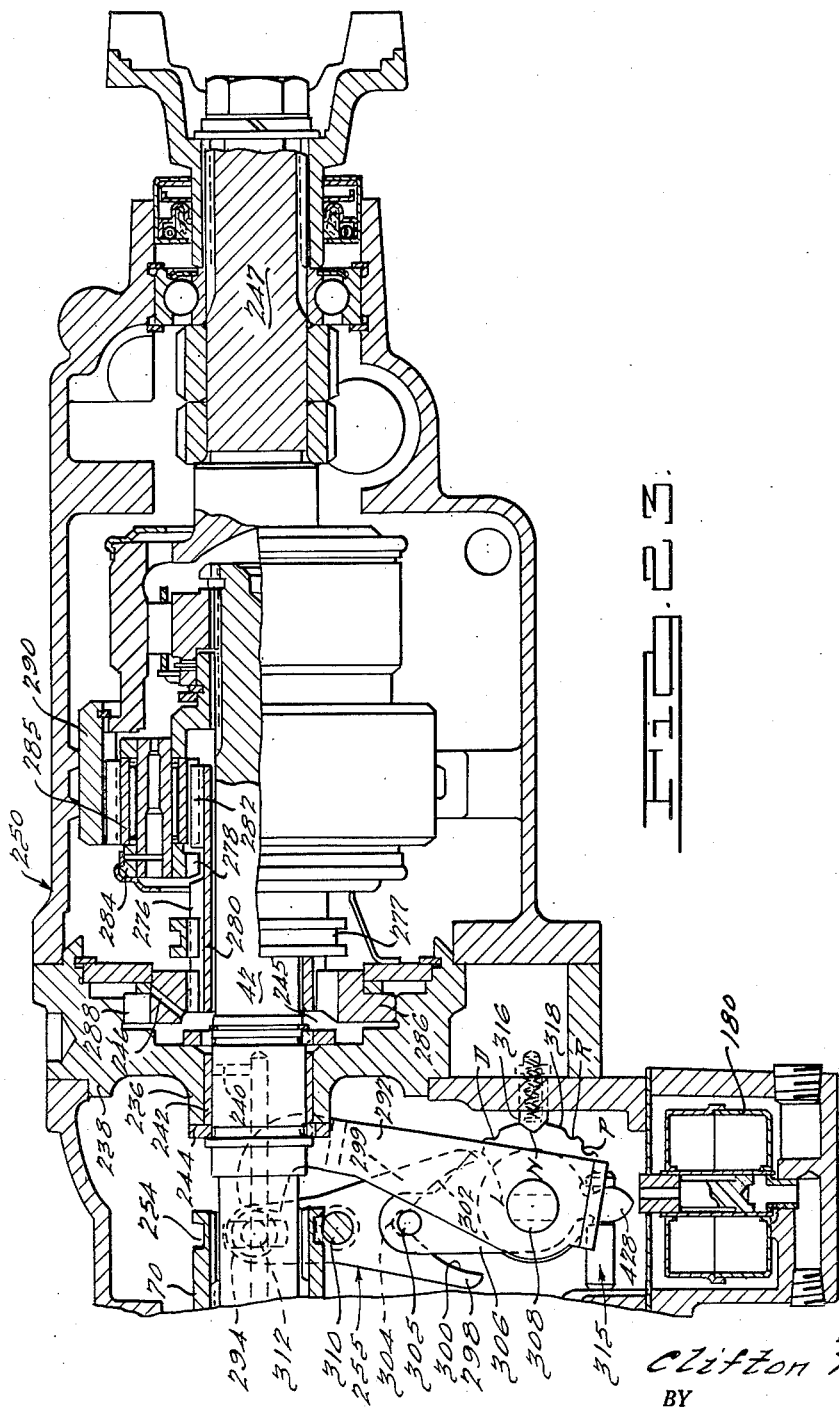
FIG. 23 is a substantially central fragmentary longitudinal sectional view of a transmission construction which, although generally similar to that shown in FIGS. 1 and 2, is modified by the addition of an automatic overdrive unit thereto.

General Arrangement of Principal Mechanical Components of the Transmission

Referring now to the drawings, a preferred transmission construction is shown diagrammatically in FIG. 1, but it will be appreciated that many of the control features of my present invention may be utilized in conjunction with transmission of varying construction. The mechanical arrangement of the power-handling components of the transmission construction illustrated in FIG. 1 corresponds closely to that disclosed in my copending application, Serial No. 189,981, above referred to, but I have perfected certain improvements which will be brought out in the subsequent detailed description, and I have also developed greatly improved lubrication means, control means and oil supply means, particularly suitable for use with this type of transmission, but not exclusively restricted to such use, as will also be developed more particularly hereinafter.

The principal mechanical components of the transmission per se comprise a hydraulic torque converter, generally designated 25, drivable from the input shaft 26, which may comprise the crankshaft of the gasoline engine of a motor car, a planetary gear set consisting of a sun gear 28, planet gears 30, carrier 32 and ring gear 33, a lockup clutch assembly 34 for the gear set, a brake band 35 for releasably holding the ring gear, a brake band 36 for releasably holding the carrier 32, means including a transmission shaft 38 connecting the sun gear 28 to the output of the hydraulic torque converter, and means comprising a forward-neutral-reverse shifter assembly, generally designated 40, for selectively either disconnecting the output shaft 42 to establish a mechanical neutral, or, alternatively, connecting the output shaft either to the carrier 32 or to the ring gear 33.

The impeller 44 of the torque converter is connected to and drivable by the crankshaft 26 and is arranged to impart torque in the conventional manner to a driven member 45 which is fast with respect to transmission shaft 38. The reaction member 46 may also function in the customary manner, being connected through a one-way reaction brake 48 and a fixed sleeve 50 to the casing wall 86. Transmission shaft 38 is fast with respect to sun gear 28 and is also connected through a laterally extending web 54 to clutch plates 55 of friction clutch assembly 34. Coacting clutch plates 56 are fast with respect to carrier 32. The clutch 34 is biased to disengaged condition, but is engageable by fluid pressure introduced into a cylinder space 58 contained in a drum 60 which houses the clutch assembly 34. A piston 62 in the drum 60 serves to force the plates together for clutch engagement.

Reverse brake band 36 is engageable with the cylindrical external surface of drum 60, being biased off, and engageable by fluid pressure means presently to be described. Low speed brake band 35 is selectively engageable with a drum 64 fast with respect to ring gear 33. Drum 64 is also connected by a web 65 to a toothed clutch member 66. Clutch member 66 constitutes the reverse driving clutch member of the forward-neutral-reverse selector clutch assembly 40.

Carrier 32 is connected to a toothed clutch element 68 coaxial with and somewhat spaced from clutch member 66. Clutch member 68 constitutes the forward driving clutch member of the forward-neutral-reverse clutching assembly 40. The shiftable clutch member of clutch assembly 40 comprises a longitudinally slidable sleeve 70 concentric with and keyed to the output shaft and slidable forwardly to engage clutch member 68 to key the output shaft 42 to the carrier 32, slidable rearwardly to engage clutch member 66 and thereby key the output shaft 42 to the drum 64 and ring gear 33 or, alternatively, adapted to occupy an intermediate neutral position in which it is disengaged from both of the clutch members 66, 68, at which time the output shaft 42 is disconnected from the transmission.

It will be appreciated that with such a transmission system, the designer has considerable latitude as to mode of operation. With the horsepower/weight ratio existing in present day passenger cars, and the efficiencies and torque factors available in modern hydraulic torque converters, it is practical to start the vehicle through the torque converter with the runner 45 directly connected to the output shaft, for ordinary nonshift driving, while providing for a manual shift to a geared ratio when higher torque is desired; the geared ratio being in series with the torque converter, so that the vehicle may be accelerated with the aid of both the torque converter and the gearing when desired.

In the preferred construction shown, the runner 45 is directly connected to the sun gear 28, and reaction brake band 35 is always disengaged, upon starting with the hand shift lever in the normal "drive" setting. At such time clutch 34 is engaged and the gearset is locked up. When desired, the shift lever may be moved to a "low" setting in which band 35 is engaged. In such "low" setting, the clutch 34 is disengaged, reverse brake 36 is disengaged, and the converter output shaft 38, acting through sun gear 28, rolls pinions 30 on ring gear 33, imparting a reduced speed forward drive to carrier 32. In both such forward drives the slidable clutch member 70 is in the forward position.

Reverse drive, which is manually instituted, is effected by disengaging clutch 34 and brake 35 and engaging reverse brake 36 to hold the carrier 32 stationary, and moving the sliding clutch member 70 to engage reverse clutch member 66 and couple the output shaft 42 to the ring gear. The engine then drives the sun gear 28 forwardly, turning the planet gears 30 rearwardly on their stationary carrier shafts and imparting reverse rotation to ring gear 33 and thereby to the tail shaft.

*Torque Converter—Arrangement and Oil System Thereof*

In the preferred mechanical embodiment of my improved transmission mechanism shown in FIG. 2, the crankshaft 26 is connected through the agency of spring disk means 75 to the rotary casing 76 of the torque converter. A web portion 77 forming an integral radial inward extension of the rotary casing 76 supports at its center a forwardly projecting pilot 78 in a pilot bearing 80 in the rear end of the crankshaft. The impeller 44 is secured to the rear peripheral margin of the rotary casing 76 and extends radially inwardly as the rear member of the torque converter. The impeller has an integral bearing sleeve 82 journaled by means of a smooth bearing 84 on a stationary tubular supporting sleeve 85. Sleeve 85 is rigidly carried by and extends forwardly from a transverse partition wall 86 which separates the casing portion 88 which defines the torque converter compartment from the casing portion 90 which defines the gearing compartment. A circular flange 92 projects integrally from the partition wall 86 and is radially out-spaced from and concentric with hub 82 and sleeve 85. Flange 92 carries a lubricant retainer 94 which prevents escape of any lubricant which may leak past bearing 84.

The reaction member 46 of the hydraulic torque converter and the one-way brake 48 fitted within the same are carried upon a fixed hub 95 splined upon the forward end of the stationary supporting sleeve 85. The runner 45 is secured to a web 96 splined upon the conformably splined forward end of the transmission shaft 38. The runner and web 96 are spaced rearwardly from the impeller supporting web 77, such space being designated 98. A web portion 100 integral with the runner 45 and coacting with and secured to the web 96 to support the runner is offset rearwardly to provide a relatively wide and rigid base of support for the runner, the offset web portion 100 also projecting inwardly into engagement with the splined hub portion 102 of web 96. Offset portion 100 projects rearwardly to a position close to a ring 104 which closes the forward side of the one-way brake assembly 48, and a flat bearing disk 105 is interposed between the parts 100, 104. A ring 106 also closes the rear of the one-way brake assembly and is substantially sealed with respect to the adjacent wall of the impeller supporting web by a flat bearing disk 108.

The space within the torque converter communicates with a longitudinal oil passage 110 formed by an internal groove in stationary hub 85. Passage 110 communicates through a radial port 112 at its forward end with the space within hub 82 forwardly of bearing 84 and thereby into and through appropriate passage means in the overrunning brake assembly, as indicated at 114, 117, into the space between the supporting web of the impeller and the reaction member and through the clearance between the reaction member and impeller and between the reaction member and impeller into the vortex passages.

During operation of the engine, oil is continuously supplied to the torque converter through a conduit 120, inlet ball check valve 122, and passage 124. Passage 124 extends inwardly through partion wall 86 and at its inner end communicates with the longitudinal passage 110, as previously mentioned. Passage 110 may be formed by the provision of a spline-like groove or grooves in the interior of the stationary supporting hub 85, and is closed by a relatively thin sleeve 125 fitted into the hub 85.

An integral rearward extension portion 111 of the groove 110 extends rearwardly of the partition 86, to conduct oil to transmission bearing components for lubrication, in a manner presently to be described.

Oil is continuously discharged from the torque converter during operation through the gap 126 between the outer peripheral edges of the impeller 44 and runner 45. The discharged oil flows inwardly through the space 98 between casing 76 and runner 45 and between webs 77—96, and thence inwardly through passages 128 in the pilot hub 78 into an opening 130 formed in such hub and which is open at its rear end adjacent the forward end of the transmission shaft 38. An axial passage 132 is formed in the transmission shaft, and is open at its forward end to receive the return oil from the torque converter, which flows thereinto from the opening 130. Passage 132 extends rearwardly far enough to overlap an annular passage 133 formed by a reduced portion of the shaft 38 and passage 132 communicates with passage 133 through radial passages 134. The annular passage 133 is closed by the sleeve 125, which also closes the open inner faces of inlet passages 110, 111, previously mentioned. An outlet hole 135 is formed in sleeve 125 in registry with another radial passage 136 formed in the partition 86. The fluid outlet from the torque converter is restricted, so that a pressure build-up will occur in the torque converter during operation thereof, and so that such build-up of pressure will have desired characteristics. In the illustrated embodiment of the invention, the outlet 138 communicates with two restricted escape ports 140 and 142, as shown in FIG. 3. These merely serve to restrict the outlet, and one or any number of such ports might be used.

The torque converter outlet conduit 138 also communicates through a branch conduit 144 and a restriction 145 with the chamber 146 of a modulated pressure control valve, generally designated 150, and the details and operation of which will presently be considered.

The fluid delivered through the restricted outlets 140 and 142 may be utilized to lubricate components of the engine-transmission assembly. In the engine it is often necessary to lubricate certain parts by squirt means from the engine pressure lubricating system. These consume an appreciable part of the pump capacity, especially at low idle. In a preferred installation which I have constructed, the outlet from orifice 140 is employed to lubricate the timing gears of the engine, and the outlet from orifice 142 is utilized to lubricate the fuel pump of the engine in lieu of such squirt holes from the engine lubricating system, thereby conserving pump capacity and utilizing the required oil flow through the converter for such lubrication.

I have found that with a restriction in the outlet, the difference in the pressure of the fluid at the inlet of the torque converter and at the outlet of the torque converter varies in a certain relation to the torque multiplication in the converter. The difference between the oil pressure entering the converter and the oil pressure leaving the converter is employed to influence the action of the modulated pressure control valve 150, in accordance with variations in converter torque ratio, by constructing the valve with a piston 152 which is subjected on one side (the lower side in the preferred embodiment illustrated) to the pressure of the oil entering the converter, and on the other side (upper) to the pressure of the oil leaving the converter. The valve is utilized to influence the pressure of the fluid delivered to the servo motors for actuation of the transmission brakes and clutches, in a manner which will presently be considered in detail.

*Integrated Oil Supply System*

In my preferred construction, the oil for actuation of the servo motors, for the hydraulic torque converter, for the control system, and for lubrication of the engine, is all derived from a single pump, designated P, which may constitute the oil pump of the engine, and may be mounted and driven in the conventional manner. I have found that some automobile engines are presently equipped with oil pumps having adequate output for this purpose, although larger pumps may, of course, be installed.

In FIG. 8 I have diagrammatically indicated the engine oil pan or sump at 155 and the oil sump of the transmission at 156. The pump P is arranged to draw oil from the pan 155 through a riser pipe 158, and the pump inlet is also connected through a branch inlet pipe 160 to the bottom of transmission sump 156. Means is provided whereby, when the oil in the transmission sump is above a predetermined level, the pump P draws oil from the transmission sump until a predetermined minimum level is reached.

The oil inlet means may be attached to and supported by the lower end of the riser pipe 158, and comprises an inverted sheet metal belled portion 162 interiorly communicating with the pipe and having an annular sheet metal bottom wall 164 with a central inlet hole 165 bounded by a re-entrant upturned rim. An annular screen 166 arranged within the inlet housing is peripherally secured to the lower end of the bell, being clamped between the periphery of wall 164 and a bead 168 which is formed upon the bell and which also embraces the edge of the bottom wall 164. A substantially cylindrical cup-like valve assembly 170 is centrally mounted in the screen, and the central portion of the screen is flexible vertically so that the screen and valve may move from the lowered position in which it is shown in FIG. 8 and in which the valve closes the inlet hole 165, to a raised position in which it is forced up against the top wall of the bell, at which time fluid may enter the inlet casing through hole 165. The valve has a flat bottom wall 171 which overlies and closes the inlet hole 165 when the valve is in the lowered position, and the cylindrical wall 172 is sealed with respect to and projects upwardly from the bottom wall 171. A plurality of radial openings 174 are formed in the cylindrical wall 172. The valve 170 is concentric with and somewhat larger in diameter than the riser pipe 158. The body of the valve 170 is loosely fitted in a central opening in the screen 166. The hole in the screen is bounded by a rim piece 175, and the bottom wall 171 of the valve projects outwardly beneath the rim piece. The screen bears downwardly against the valve. As initially constructed, and normally throughout the life of the apparatus, the rim 175 is positioned below the openings 174 and remains below such openings so that the oil cannot enter the pipe 158 without passing through the screen. If the screen should become clogged, however, the pressure difference induced by the pump, acting upon the clogged screen, will pull the screen and the rim 175 upwardly above the openings 174, whereafter oil may enter the valve below the screen, and reach the oil inlet pipe despite the clogging of the creen. The strainer 166 acts as a spring, urging the oil inlet valve 170 downwardly and biasing the valve closed so that 2–4 lbs. per square inch pressure is required to open the valve.

The hollow cylindrical float 180 in the transmission oil sump is formed with a tubular internal wall 182 which acts as a valve, closing communication between the sump 156 and pipe 160 except when the oil level in the transmission sump rises above a predetermined level. The float is vertically slidable upon a stationary guide 184 which is provided at its lower extremity with a threaded nipple portion 185 which is screwed in an upwardly opening orifice 186 in the bottom of the sump, such orifice being in fluid tight commuication with the pipe 160. A vertical passage 188 extends upwardly part-way through the nipple portion 185 and guide 184 and communicates with a pair of lateral ports, as 190, which project outwardly therefrom and are open at the cylindrical surface of the guide in an area which is covered by the tubular float portion 182 when the transmission oil sump is substantially empty. The inner wall of the tubular portion 182 thus closes off the ports 190 until the float is lifted. As the transmission is oiled by pressure from the engine pump, the flow out of the bearings etc. of the transmission will collect in the sump 156. When the sump fills enough to raise the float and uncover the holes 190 in the float guide, the pump, acting in cooperation with the valve 170 in the engine oil strainer inlet assembly 162 will draw the oil out of the transmission sump, causing the float 180 to drop and again cover the holes. The float thereby maintains an oil level in the transmission and is preferably located so that the level is maintained below the brake bands.

The engine oil pan and transmisison sump are also connected by a second pipe 195. Pipe 195 enters the engine pan 155 at approximately the normal high oil level, and such level is preferably such that when the car is level, the oil level in both the engine and transmission is below the brake drums in the transmission. Pipe 195 preferably enters engine pan 155 at the side, and this position is so selected that the level at the point of entry of the pipe 195 into the engine pan does not vary appreciably when the car is on an upgrade or a downgrade. Even on an upgrade, therefore, little or no oil will flow by gravity from the engine sump to the transmission through pipe 195.

If the float 180 should become stuck in the down position, covering the suction holes 190; as soon as the transmission sump fills with oil above the high level, it will flow by gravity through the oil level pipe 195 back to the engine pan. If on the other hand the float should stick in the up position, and the oil level pipe were not included in the system, the oil would first be drawn out of the transmission sump by the engine pump and thereafter air would be sucked into the pump instead of oil, adversely affecting the pressure system. With the oil level pipe 195 in the system however, if the float should stick in the raised position, the extra oil sucked from the transmission sump will raise the oil level in the engine pan and the excess oil in the pan will return by gravity through the oil level pipe 195 to the transmission sump and maintain an oil level in the transmission sump above the holes 190, thereby preventing the drawing of air through such holes. The drainage and flow from the pressure system to the engine pan is much greater than the flow to the transmission sump and the position of the connection between pipe 195 and the pan 155 is such as to maintain the proper level in the engine pan, as previously mentioned.

Thus the car may be driven indefinitely, even if the float 180 should stick, and while the oil level might rise higher than desired in the transmission on upgrades, the excess oil will flow back to the engine pan when the car again reaches a level or downgrade.

*Lubrication of gear transmission components*

The part of the oil supplied to the conduit 120 which is conducted rearwardly from inlet pasage 124 through groove 111 is led from the rear end of groove 111 through a passage 198 extending angularly outwardly and rearwardly therefrom and which is open at the surface of a rearwardly extending fixed tubular support 200, shown as formed integrally with the partition 86 and extending to a position adjacent the sun gear 28. A flat annular bearing 202 is interposed between the support 200 and the sun gear. A supporting hub portion 204 of the drum 60 is journaled upon the support 200, a bearing 205 being fitted in the hub 204 and lubricated by the oil supplied through passage 198. A passage 206 also intersects passage 198 within the bearing 205 and extends angularly inwardly and rearwardly, and conducts oil for lubrication through an opening 208 in a bearing sleeve 210 which supports the rear portion of the shaft 38. The oil passes radially inwardly tthrough hole 208 and through a radial passage 212, into a rearwardly extending axial passage 214 which, as shown in FIG. 2, extends to and is open at the rear end of the transmission shaft 38.

The forward end of output shaft 42 is slightly spaced from the rear end of transmission shaft 38, thereby providing space through which oil may move radially outwardly and through radial passages as 215 in the hub of the carrier 32 and through a continuation portion 216 of such passage 215. Passage 216 terminates behind the stub shafts 218 upon which the planet gears 30 are mounted and communicates with longitudinal passages 220 in such stub shafts which in turn connect with radial passages 222 through which lubricant is conducted to the planet gear bearings. Thus full pressure lubrication is supplied at all times to the planet gear bearings, and the oil which escapes from such bearings assists in lubricating the engaging tooth surfaces of the planet pinions and ring gear 33.

The carrier assembly 32 is formed in two parts, comprising a forward section 224 and a rear section 225, held together by rivets 226. Carrier section 224 is provided with a hub 228 which overlaps and is journaled on the abutting ends of shafts 38 and 42. A web portion 230 integral with the hub 228 extends outwardly to support the remainder of the carrier and the components attached thereto. The rear portion 225 has an annular web 232, the periphery of which is tightly held against the periphery of web portion 230 by rivets 226. The abutting central regions of the web portions 230, 232 are relieved to provide the fluid passage space 216 therebetween.

From the front peripheral edge of carrier section 224 a flat annular flange 233 extends radially outwardly. Flange 233 is keyed to the drum 60 so that the drum and carrier rotate as a unit. At its forward end the drum 60 is supported by web 234, which is integral with hub 204.

An axial passage 235 is drilled rearwardly into output shaft 42 from the front and to a position inside bearing support 236 which is carried by the transmission rear wall 238. A passage 240 communicates with the rear end of passage 235 and conducts oil outwardly to lubricate the output shaft bearing 242.

As shown in FIG. 23, a supplemental overdrive gear unit 250, of a type in common use may be attached to the rear of the transmission to provide an automatic shift between a geared drive ratio and a direct drive ratio. The overdrive unit shown in FIG. 23 will be recognized as of a familiar type and will require no detailed description. No change in the other transmisison components is made when the overdrive unit is employed therewith, although the axle ratio may of course be altered. As shown in FIG. 23, the forward end of the bearing support 236 is substantially sealed by means of the thrust member 244, and oil which escapes rearwardly from the bearing enters a chamber 245 and flows outwardly therefrom through angular passage 246 to oil the blocking and solenoid-operated shifting mechanism of the overdrive unit. The use of the overdrive unit is optional. Its torque output may be conducted to the driving wheels of the vehicle in the usual or any desired manner as through output shaft 247.

*Mechanical Shift Mechanism*

The forward-neutral-reverse shifter is provided with synchronizing means which is effective upon shifting from neutral to forward drive. Slidable clutch sleeve portion 70 is splined upon the output shaft 42. The shift sleeve 70 is provided at its rear end with a peripheral groove 254 by which it is actuatable through the agency of a fork 255, which corresponds to the fork designated 210 in my copending application, Serial No. 189,981 and operates in similar fashion to move the shift sleeve 70 to its three positions. A synchronizing clutch member 252 is slidably splined upon the forward end of clutch sleeve 70 and is provided at its front end with a cone clutch portion. A plurality of radial holes (undesignated) are formed in the synchronizing clutch member 252, and a ball 256 is radially movable in each hole. A spring shown as a partly circular spring wire 258, encircling and bearing inwardly against the balls, urges the latter inwardly. The forward extremities of the splines 260 on which the synchronizing clutch member 252 is mounted constitute clutch teeth which, when sleeve 70 is moved forwardly all the way, mesh with concentric internal teeth 262 formed in the rearwardly extending clutch hub portion 68 which is integral with carrier web part 232. Also integral with web portion 232 and clutch hub 68 is a synchronizing cone clutch portion 265 adapted to receive and coact with the male synchronizing cone clutch member 252. Peripherally aligned depressions 266 formed in the tops of the spline teeth 260 constitute in effect a peripheral groove into which the balls 256 are projectable so that the balls act as detents, yieldably opposing forward sliding movement of the clutch sleeve 70 to provide the synchronizing pressure. When the sleeve 70 is urged forwardly, the cone 252 first engages the coacting synchronizing clutch portion 265 to synchronize the clutchable portions, whereafter further effort exerted upon the sleeve 70 moves the toothed portion 260 thereof into the engagement with internal teeth 262, the balls 256 moving out of the groove 266 to allow the clutch sleeve 70 to move forwardly with respect to cone 252.

The web 65 which supports drum 64 and ring gear 33 is provided with a rearwardly extending cylindrical hub 264, journaled in an annular support 272 integral with the transmission case. At its rear end, the hub 264 is splined to clutch sleeve 66, which is fitted thereinto. Internal clutch teeth 275 formed in the sleeve 66 constitute the reverse drive clutch teeth and are adapted to intermesh with spline clutch teeth 260 when the sleeve 70 is pulled rearwardly all the way, to the reverse drive position. The spacing between the forward drive clutch teeth 262 and the rearward drive clutch teeth 275 exceeds the length of clutch teeth 260, affording a neutral position when the clutch sleeve 70 is in its middle position. When the clutch sleeve is pulled rearwardly from the forward drive position to the neutral position, the rear end of synchronizing clutch cone 252 strikes the forward end of clutch sleeve 66 so that sleeve 70 moves to the rear with respect to cone 252 and the latter is returned to its set position with the detent balls 256 engaging the groove 266.

If an overdrive unit of the preferred type, designated 250 in FIG. 23, is employed, it also incorporates a slidable clutch member, designated 276, actuatable, as by mechanical connection to the driver's compartment through the agency of a Bowden wire cable or the like (not shown), such shifting means acting upon a suitable collar as 277 to slide the clutch member forwardly and rearwardly. When the clutch member 276 is in the forward position shown in FIG. 23, the overdrive is shiftable in the usual manner by manipulation of the accelerator pedal, but when the clutch collar 277 is moved rearwardly to engage the teeth of member 276 with clutch teeth 278, the planetary gear system of the overdrive unit is locked up, so that a direct drive is afforded through the overdrive unit. Clutch member 276 is integral with the sleeve 280 which carries the sun gear 282 of the overdrive unit, and clutch teeth 278 are fast with respect to the carrier 284 for the overdrive planet pinions 285. The toothed forward extremity of clutch member 276 remains in slidable engagement with the conformably toothed and interfitted ring 286 in all positions of the clutch member. When slid forwardly to disengage the teeth 276 from the clutch teeth 278, the clutch member remains keyed to the ring 286, and during overdrive operation, the ring 286 is adapted to be held by a solenoid actuated sprag or the like (not shown) engageable with a peripheral notch as 288 in the ring 286, such operation being conventional. This holds the sun gear 282 stationary and the carrier is then driven by the shaft 42 to impart an overdrive to the internal gear 290 to which the propeller shaft is connected.

In order to automatically lock out the overdrive unit when the forward-neutral-reverse clutch sleeve 70 is moved to reverse position, an arm 292 is provided which is mechanically connected to the overdrive clutch collar 277 by suitable means (not shown), arm 292 being movable rearwardly as the clutch member 70 is moved to reverse position, thereby moving collar 277 and clutch member 276 to the rear to engage the latter with clutch teeth 278 and lock up the overdrive unit. The upper end of arm 292 lies in the path of and is engageable by the hub portion 294 of the shifter fork member 255.

The fork 255 is provided at its lower end with a double armed yoke portion consisting of a forward arm 298 and a rearwardly spaced arm 299. The inner opposed surfaces of such arms are provided with arcuate faces 300, 302 and the upper ends of such arcuate faces terminate in a deeper central notch portion 304. A pin 305 extends through the notch 304, pin 305 being carried by a main shifter arm 306.

Arm 306 is so arranged that it is effective to shift both the clutch sleeve 70 and the selector valve 315 of the hydraulic control system presently to be described. Arm 306 is fast upon the same shaft, 308, upon which arm 292 is freely pivoted. Yoke 255 is pivoted upon a pin 310. Yoke pins 312 are carried by the upper end of yoke 255, which engage in the groove 254. The yoke 255 and clutch sleeve 70 are actuated by rocking the arm 306. Arm 306 is actuated by shaft 308 rockable by means of a hand shift lever on the steering column (not shown) or other suitable means, but the shaft and arm 306 are rockable throughout a greater angle than is required to actuate the clutch member 70 to its three positions.

The shifter arm is shown in FIG. 2 in a neutral position, designated N, and which is defined by a spring-pressed detent 316 engaging in a notch N in an arcuate face 318 formed on arm 306. The arm is rockable to four other positions, which will be described, each designated by a lettered notch in the illustration of arm 306.

To move the clutch member 70 from the neutral position, N, to the forward position, D, shifter arm 306 is rocked clockwise from N to D, and the pin 305 moves out of the deeper central notch portion 304 of the yoke 255 and onto the arcuate surface 302, but if the arm 306 is rocked further clockwise, to the L position, the pin 305 merely travels along the arcuate surface 302, which surface is then concentric with the shaft 308. Such overtravel is for the purpose of actuating the selector valve 315, but does not affect the position of the clutch 70. Similarly when the arm 306 is rocked counterclockwise from the neutral or N position shown, to the extent required to move the clutch member 70 rearwardly to the reverse position, the pin 305 first moves out of the deeper notch portion 304 and thereafter, if arm 306 is rocked further, to the P position, travels over the arcuate surface 300, which is then concentric with the pin 308. A snap-acting spring-pressed detent plunger 316 is engageable with a series of appropriately positioned notches in an arcuate surface 318 provided upon the arm 306, being shown engaged with the centrally positioned notch N delineating the neutral position. The notch D corresponds to the conventional forward drive position of the transmission, the notch R corresponds to the reverse position, the notch L corresponds to a low gear position, and the notch P corresponds to a park position.

*Direct Drive Clutch and Servo*

The applying means for the direct drive clutch assembly 34 is best shown in FIG. 3. Clutch plates 56 are slidably keyed to drum 60 and clutch plates 55 are slidably keyed to a cylindrical support 54 secured to the side of the sun gear 28. The clutch actuating piston generally designated 62 may be formed of sheet metal and comprises a cylindrical hub portion 388 slidably fitted upon and sealed with respect to the hub 204 of the drum 60. The web portion 234 which is integral with the hub 204 and which projects outwardly from the forward end of the latter is provided with an integral rearwardly turned cylindrical flange 390 defining the outer wall of the piston chamber. A web portion 392 integral with the slidable piston hub portion 388 extends outwardly adjacent the web 234, and is offset rearwardly near its periphery where it supports the piston sealing ring 394 which wipingly engages the interior of cylinder flange 390. An annular sheet metal presser portion 395 secured to piston web 392 bears against the forward plate 56 and when the piston is moved rearwardly compresses the plates, forcing them against the flange portion 233. The clutch release spring 396 encircles the piston hub 388, bearing forwardly against the piston and rearwardly against an abutment ring 398 secured to the rear end of hub 204. To apply the clutch, fluid is led to the cylinder space between piston 62 and web 234, being supplied through a conduit 400, to which fluid delivery is controlled by the selector valve 315.

Conduit 400 communicates with a passage 402 extending radially inwardly through partition 86 and which in turn communicates with a longitudinal passage 404 extending rearwardly through the fixed hub portion 200 to a position just to the rear of the web 234 where it connects with a peripheral groove 405 in hub portion 200. Radial holes as 406 extend through rotary hub 204 and through these the oil is delivered to and exhausted from the cylinder space to control engagement and disengagement of the clutch. Although in FIG. 3 the conduit 400 is shown extending through the air beneath the transmission, it will be appreciated that this portion of the drawing is diagrammatic and that internal passages are ordinarily employed. As shown in FIG. 2, the passage 400 extends rearwardly through a flat housing plate 410 secured to the bottom of transmission casing portion 90. The housing 410 may contain the valve 315 and the other passages leading to and from the valve may also be formed therein. Housing plate 410 may be conveniently formed as a casting. The contouring and arrangement of such fluid passages and details of construction as to the support and configuration of the valve housing partition and the like are well understood in the art and will not require detailed consideration.

Low Speed Brake and Servo

The actuating means for the low speed brake band 35 is shown in FIG. 4. This band is biased into engagement with the drum 64 by a spring 320, the strength of which is sufficient to apply the band with the full operative force. Spring 320 is housed within a telescopic casing comprising a fixed cylinder 322 supported within the transmission casing section 90 in a lateral enlargement 324 formed upon one side thereof. Cylindrical portion 322 opens downwardly and an upwardly opening and vertical movable cylinder portion 325 is slidably fitted into cylinder portion 322 and sealed with respect to the same as by the sealing means 326, forming a tight enclosure which defines a vacuum chamber 328. The chamber 328 is adapted to be connected to the intake manifold of the engine, as by coupling portion 330 which is integral with the upper cylinder section 322, passage 332, and conduit 333. The effective expansive force of spring 320 exceeds the maximum compressive force which can be exerted upon the spring by the vacuum developed through the connection to the intake manifold, so the vacuum can never, acting alone, release the brake band, but the counterbiasing effect of the vacuum is such as to vary the amount of oil pressure which is required to release the brake.

The oil pressure acts in a cylinder 334 below a piston 335 to urge the piston upwardly whenever the oil pressure is sufficient to overcome the effective force of the spring (such force being variable with intake manifold vacuum, as noted). A rod 336 integral with the piston extends upwardly to engage slidable cylinder section 325. The lower end of the cylinder is provided with a central re-entrant wall portion 338 into which the rod 336 projects, the upper end of the rod bearing against the inner (upper) end of such re-entrant portion 338. Piston 335 is also interconnected with the movable end connector 340 of the band 35 in such manner that when the piston 335 moves upwardly, the band is released. This connection comprises a pair of trunnions 342 projecting from opposite sides of cylinder 325, a forked lever 344 having one end pivotally connected to such trunnions and having an intermediate portion pivoted upon a fixed stud 345, the other end of such lever being connected by a link 346 to the end connector 340. The band 35 is resiliently biased to move outwardly away from the drum 64, so that when the left end of lever 344 moves upwardly and the right end moves downwardly, the link 346 permits the band to expand. A light spring 348 urges the piston 335 upwardly and takes up clearance between parts when there is no oil pressure in cylinder 334 but does not otherwise substantially influence the operation. The other end of the band is adjustably anchored, being provided with an attached anchor bracket 350 held by a compression link 352 which is in turn held against movement by an adjustable anchor screw 354.

Means may also be provided for manually releasing the band 35. Such manual release means may comprise a Bowden wire cable assembly generally designated 355. The actuating wire 356 of the cable assembly is connected at its lower end to the forked end of lever 344 and at its other end may be controllable by a foot pedal or the like (not shown) located conveniently to the driver. A lost motion connection is incorporated in the Bowden wire fitting, preferably at the lower end, as in the fitting member 358, so that when the Bowden wire is in its lowered position in which it is not effective to release the band, the left or forked end of the lever 344 may nevertheless move upwardly independently of the Bowden wire, but such end can be pulled up by the wire if desired, and cannot move downwardly, to permit release of the band, if the wire is pulled up. Fluid is conducted to and from servo motor cylinder 334 through a conduit 360, the other end of which leads to the casing of the selector valve 315.

Reverse Brake and Servo

The actuating means for the reverse brake band 36 is shown in FIG. 5. Band 36 is biased to the off position, and is adapted to engage the drum 60 when fluid is delivered to its servo motor 365 from valve 315 through a conduit 366. The band tends to move away from the drum due to its own resiliency and a spring 368 is provided so arranged that a predetermined minimum fluid pressure is required to apply the band. The servo motor cylinder and connected brake actuating parts are accommodated in a laterally enlarged portion 370 of the transmission casing portion 90, the laterally enlarged portion 370 being open at the bottom and the cylinder 365 being formed as a separately attached part securable to such open bottom in fluid tight relation thereto. The servo motor piston 372 has an integral rod 374 which bears upwardly against a lever 375 pivoted on a stud 376 and having a lug portion 377 which, when the lever is raised by the piston, urges link 378 to the right. Link 378 bears against a movable brake applying bracket 380 secured to the movable end of the brake band, so that upon such movement of the lever, the band is clamped against the drum. Spring 368, of the compression type, bears downwardly against the top of the lever 375 and upwardly against the transmission casing. The anchor bracket 382 at the fixed end of the band is adjustably positioned by an adjustable anchor screw 384 similar to that employed for the low speed brake band previously described.

Selector Valve

The fluid pressure from the pump P is conducted from the pump outlet through a passage 412 and reduced orifices 414, 415 to an air pressure dome or cushioning chamber 416 having air trapped in the top and which is held under compression by the operating pressure. From the cushioning chamber the oil is lead through a conduit 418 to the inlet port 420 in the housing 422 of the valve 315. The valve is of the cylindrical spool type and the cylindrical opening in the casing 422, in which the valve is slidable, is open at both ends, as indicated at 424, 425. At its right end which projects from the casing the valve is provided with a groove 426, and an actuating lug 428 formed integrally on the lower end of arm 306 projects into groove 426 in such manner that the valve is movable to any of five positions, corresponding to the five positions of the arm 306, when the latter is rocked in the manner previously described between the several detent positions shown in FIG. 2. The corresponding positions which the valve 315 occupies in each of the detent positions shown in FIG. 2 are shown, and similarly designated in FIGS. 8-12.

The valve 315 is provided with a left end spool 430, an intermediate spool 432 and a right spool 433, such spools being spaced from one another by reduced neck portions 435 and 436, and the right end portion 438 which projects from the valve casing also being reduced. The fluid inlet port 420 from the main line 418 enters a mid portion of the valve chamber. Spacedly to the right but relatively close to the port 420 is an unobstructed port 440 which is in free communication with passage 360 leading to the low ratio servo motor cylinder 334, and spaced a similar distance to the left of port 420 is a restricted port 442 which also communicates with passage 360. The neck 436 is long enough and the valve is so designed that, with the valve in the neutral or N position, neck 436 provides communication between inlet port 420 and the ports 440, 442. The passage 400 leading to the direct drive clutch servo motor also communicates with the valve chamber at two positions, one such position being defined by a port 444 located near the left end of the valve chamber, and which is open to atmosphere through the open end 424 when the valve is in the neutral position shown, and the other communication with passage 400 being defined by a port 445 spaced farther to the right and which, when the valve is in the neutral position, is in communication with the neck 435 and is accordingly sealed off by the spools 430, 432. Passage 366 leading to the reverse brake servo motor communicates with the valve chamber at two spaced positions, one such position being defined by a port 446 located near the open right end 425 of the valve chamber and the other such position being defined by a port 448 spaced somewhat to the left of port 446.

When the valve is in the neutral position, port 448 is sealed off by spool 443, as shown, and the reverse servo motor is connected to atmosphere, via the space around neck 438. In the neutral position, it will be appreciated that, if the engine is running and the pump is delivering fluid, band 35 is released by fluid delivered to the conduit 360, while the direct drive clutch and reverse brake band 36 are also released, their servo motors being connected to atmosphere. If the engine is not running, the fluid escapes from the low speed servo motor 334 (FIG. 4) through the clearances between the valve mechanisms (other bleed means may, of course, also be provided) and the brake band 35 is applied by the spring 320. When the valve 315 is in the neutral position, the clutch sleeve 70 is also in the neutral position, both the valve and sleeve being actuated from the same hand lever or equivalent control connected to the arm 306, as previously described. Thus with the hand control in neutral, the car can roll freely even though the engine is not running, since the output shaft is disconnected from the transmission at the clutch sleeve 70.

When the hand lever is moved to the drive position, clutch sleeve 70 is shifted to the forward drive position. This shift is, of course, only made with the engine running and brake band 35 disengaged. Valve 315 then assumes the position shown in FIG. 9, in which the neck 436 overlaps the three ports 420, 442, and 445. Fluid can then be delivered from the main supply line 418 to the low speed brake servo through the constricted port 442 and to the direct drive clutch servo cylinder through port 445 and passage 400. In such a shift from neutral to direct the low speed band remains released and the car is ready to start in direct gear drive, through the torque converter, as soon as the accelerator is depressed and the direct drive clutch engages. The rate of engagement and the engagement pressure are controlled in accordance with the torque multiplication in the torque converter and the relative throttle setting, as will be hereinafter described.

With the valve 315 in the drive position, the reverse servo is vented to atmosphere through the open right end 425 of the valve chamber. Port 444 is sealed by spool 430 and the fluid to the direct clutch servo motor passes from port 420 around spool 436 and through port 445 and conduit 400 to the direct clutch actuating servo motor.

When the valve 315 is moved to the L or low speed position, at the extreme left, as shown in FIG. 10, the clutch 70 remains in the forward drive position, all three servo motors are drained, and the low speed band 35 is accordingly engaged under the influence of spring 320, so that the ring gear 33 is held stationary and low gear drive obtains through the mechanical path previously explained. At such time the port 446 and the port 440 are both drained through the right end opening 425 of the valve chamber, spool 433 having then moved partially to the left of port 440 to uncover the latter so that both the low speed servo and the reverse servo are drained, resulting in disengagement of the reverse band and engagement of the low speed band, as previously explained. The left spool 430 has then moved partially to the left of port 444 and the neck 435 establishes communication between the port 444 and a drain port 455 formed in the wall of valve casing 422 and offset to the right from port 444 but located to the left of port 445. At such time the spool 433 seals off the inlet line at port 420. Upon shifting from direct to low, the low speed brake cylinder, being dumped through the large area port 440, allows fast engagement of the brake band 35, which prevents racing of the engine.

When the selector valve 315 is shifted to the reverse position R, shown in FIG. 11, the clutch sleeve 70 is moved to the reverse position previously described to couple the transmission output shaft 42 to the ring gear 33. The direct clutch servo is vented through the left end opening 424 of the valve casing, the neck 436 bridges the port 420, 440 and 448, port 446 being sealed off by spool 433 and fluid is consequently supplied from the main line via port 420 through port 440 and conduit 360 to the low speed servo to disengage the low speed brake and through the port 448 and conduit 366 to the reverse brake servo cylinder 365 to engage the reverse brake band 36 with the drum 69, establishing reverse gear drive through the mechanical path previously outlined.

When the selector valve 315 is shifted to the "park" position, designated "P," shown in FIG. 12, the clutch sleeve 70 remains in the reverse position previously described and the output shaft is therefore coupled to the internal toothed gear 32 and to the drum 64. In the "park" position the pressure supply line 418 is sealed off at the port 420 by the spool 432. The fluid line 366 to the reverse brake servo is vented through a vent port 437 which extends through the side of the valve casing 422 approximately midway between the ports 446, 448. In the "park" position the ports 437, 448 are in communication via the neck space 436. The line 360 is also vented, inasmuch as the neck space 436 also bridges the port 440, placing port 440 in communication with vent port 437. The line 400 to the direct clutch servo is vented via port 444 and the open left end 424 of the valve casing. In the "park" position, therefore, regardless of whether or not the engine is running, the low speed brake band 35 is held engaged under the full pressure of spring 320, and this brake holds the output shaft stationary through the clutch assembly 40, to provide a parking brake.

*Pressure Regulating System General Considerations*

It is very advantageous to control the pressure that operates the transmission brake bands and direct drive clutch so that the pressure will vary with the requirements of these elements, which in turn will vary with the product of the engine torque and the torque multiplication of the converter. For example, if 100 p.s.i. is required to hold the clutch on a full throttle start, utilizing full engine torque and maximum converter torque multiplication, very much less pressure would be required for light throttle load driving where there is low engine torque and no converter torque multiplication. To use the 100 p.s.i., which must be available when needed, for all conditions, unnecessarily reduces the life of the pump, heats up the oil more than necessary, and consumes more horsepower from the engine than required. It is also possible to greatly improve the smoothness of shifting by varying the pressure in accordance with my improved system. For example, if a light throttle shift were made from low to high with 100 p.s.i. acting to engage the clutch, the clutch engagement would be very severe and the shift would seem "harsh" to the driver and passengers; whereas, if the pressure were say 50 p.s.i. or less, a good quality of "soft" clutch engagement could be had. The same situations would obtain in shifting from neutral to drive or to reverse.

Several systems have been employed for varying the effective engaging pressure in accordance with engine torque, including means connecting the engine throttle to a pressure regulating valve, or means responsive to the pressure in the intake manifold of the engine. However, with these controlling features only, and a converter having a torque ratio of over 2:1, it will be seen that most normal driving would have to be done with over twice the effective pressure actually required to hold the transmission brakes and clutching means, inasmuch as most driving is done with the converter not multiplying the torque.

I have found that with constant input oil pressure to the torque converter, the converter oil outlet pressure will vary with the torque multiplication of the converter. The degree of such variation depends among other things on the flow restriction of the oil leaving the converter. The higher the torque multiplication of the converter the greater is the increase in outlet oil pressure of the converter in respect to its inlet pressure.

In my improved system the difference between the oil pressure entering the converter and the oil pressure leaving the converter is employed to influence a pressure modulating valve, previously referred to generally, and designated 150, the action of such valve being made to regulate the effective pressure which is operative upon the servo motors for the brake bands and direct drive clutch. The action of such valve is also modified by the vacuum in the intake manifold of the engine.

*Pressure Modulating System*

Integral with the piston 152 of modulating valve 150 is a spool 460 which controls communication between the pump outlet 412 and a passage 462 leading to the inlet 464 of the oil filter assembly 465. A passage 466 branching from the passage 412 leads to a chamber 468, into and through which the spool 460 is slidable. When the valve 150 is all the way down, as shown in FIG. 8, spool 460 closes communication between the chamber 468, connected to the pump, and the chamber 470, located below chamber 468, and which is connected to the filter. When the valve is raised so that the lower end of spool 460 is in chamber 468, upward and downward movements of the valve will vary the flow of oil from the pump to the filter inlet line 462 and thereby modulate the pressure developed by the pump in the main line 418.

Pump pressure also acts upwardly upon the valve 150, being led through a passage 475 and a restriction 476 to a chamber 472 at the lower end of the valve, where it acts upwardly upon a spool 474 carried by the lower end of the valve. A restricted connection, formed by a reduced orifice 477 and a passage 478, is also provided directly from the pump delivery passage 412 to the filter inlet line 462. While the connecting portion 470 is shown as a chamber between the spools 460 and 474 of the modulating valve, this has no effect upon the valve, inasmuch as the spools 460, 474 are of the same size, but it will be seen that the underside of spool 474 has a greater area exposed to (upward) pump pressure than the upper side of spool 474 has exposed to (downward) pump pressure.

The oil filter 465 is of the type having a hollow cylindrical filter cartridge 480 through which the oil passes radially inwardly, from a peripheral inlet chamber 482 connected to the inlet 464, to a second cylindrical chamber 484 which is inside the cartridge but which lies outside the outlet pipe 485, such pipe also serving as a support. Orifices 486 in the pipe permit filtered oil to pass to the filter outlet 488.

The filter is also provided with a spring biased disk-type by-pass valve 494 which opens under the oil supply pressure if the filter unit becomes clogged. It will be appreciated that the filter details are subject to variation, and the filter construction shown is, in fact, of a known type. The filter inlet chamber 482 includes an outer end portion 490 from which the oil can flow radially inwardly through ports 492 in the outer end of pipe 485, but such outer end of the pipe is normally sealed off from communication with the filter outlet when the valve disk 494 is seated on the valve seat ring 495, which is secured in the pipe between the ports 492 and the holes 496 in the pipe, valve 494 being urged against its seat by a compression spring 498. If, due to clogging of the filter unit, the inlet pressure rises above a desired value which is determined by the spring 498, the valve disk 494 is moved away from its seat by the inlet pressure, permitting the oil to flow through chambers 482, 490, ports 492 and outwardly through ports 496 and through chamber 484 and ports 486 to the filter outlet 488.

The filter outlet 488 is connected to the conduit 120 leading to the torque converter inlet. A branch passage 500 from the conduit 120 also leads to the engine-lubrication system, to lubricate those components of the engine to which oil is not supplied from the restricted torque converter outlet ports 140, 142. A branch passage 502 from the filter outlet also leads through a restricted orifice 504 to the cylinder space 505 beneath the piston 152 of the modulated pressure control valve. Another branch passage 506 connects the filter outlet, through a damping restriction 508, to a cylinder space 510 located at the right end of a pressure control valve, generally designated 511, which is arranged to maintain a constant pressure in the torque converter inlet and in the engine oil supply. This valve comprises two spools 512, 514 separated by a neck 515 and urged to the right, as shown in the drawing, by a compression spring 516. The righthand spool 514 acts as a piston and pressure in cylinder space 510 urges the valve to the left against the resistance of spring 516. When the right end of spool 512, which acts as the valving element, moves to the left of the partition 518 through which such spool is slidable, communication is established between the filter inlet passage 462 and a vent passage 520 which opens into the engine pan. The chamber 522 which lies at the left of the partition 518 is in direct communication with the filter inlet 462, as shown.

The filter outlet is also in communication, through a branch passage 524 and a ball check valve 525 with the space 146 above the piston 152. The space 146 is also in communication with the converter outlet via conduit 144. The check valve 525 is urged closed by its spring and by converter outlet pressure against the filter outlet pressure, so that the check valve only opens when the filter outlet pressure, which corresponds to converter inlet pressure, exceeds the converter output pressure by a predetermined amount. In my preferred embodiment this differential pressure is set at approximately 4 p.s.i.

Additional upward bias is adapted to be exerted upon the modulated pressure control valve 150 by and in proportion to falling pressure in the intake manifold of the engine. A cylinder 526 is spaced below but in axial alignment with the valve 150 and contains a piston 528, the cylinder being open to atmosphere below the piston while above the piston the cylinder is connected as by conduit 530 to the intake manifold. The piston has a rod 532 which is adapted to bear upwardly against a pin 534 which in turn bears upwardly against the lower end of valve piston spool portion 474, when the piston 528 is urged upwardly by atmospheric pressure due to a reduction in pressure in the intake manifold. The space below piston 528 is open to atmosphere as indicated at 479. The rod 532 is not attached to the pin 534 and downward movement of the piston accordingly has no effect upon the valve. As shown, the rod portion 532 may be sealed with respect to the casing and the space above such sealed rod is preferably vented to atmosphere as indicated at 535.

*Operating and Design Considerations of Pressure Modulating System*

The parts are so designed that at light throttle and with substantially no hydraulic pressure acting upon the modulated pressure valve 150, the valve will be lifted sufficiently against the force of its biasing spring 151, so that oil will pass beneath spool 460 from the pump supply to the filter inlet at a rate such that the pressure in the main line 418 will be maintained at a minimum value which is required to hold the transmission brakes and clutch engaged at light loading. In other words, they are held engaged with sufficient force to transmit the required torque when traveling at light throttle. Such pressure might be of the order of 40 p.s.i. The calibration of valve 511 is such as to maintain a constant pressure (e.g. approximately 43 p.s.i.) for the engine and converter. Only the flow required to maintain this pressure passes through the filter, the excess being dumped from the valve 511 to the engine pan through the port 520 before passing through the filter. Important advantages result from the fact that the oil pressure reacting on the valve head 514 is from the outlet of the filter. One of these advantages is that a constant desired pressure is maintained in the filter outlet regardless of the condition of the filter, because the valve 511 will not open the dump port 520 until the desired pressure is reached by the outlet side of the filter. Even if the filter becomes completely clogged, therefore, and its by-pass valve 494 opens, the same desired pressure will be maintained. Another factor is that the damping action of the oil passing through the filter eliminates all possibility of vibration of the valve 511. Another advantage is that the actuating parts of valve 511 are protected by the filter. Still another advantage is the fact that filter cartridges will last longer, due to the fact that the pressure forcing oil through the filter increases as the filter clogs up. Due to this factor, the by-pass valve 494 in the filter can be set to open at a higher pressure. Thus the full designed pressure is always available for engine lubrication and for the torque converter, and to control the action of the modulating valve, whereas with other known designs having a valve controlled by the pressure of oil entering the filter in conjunction with a by-pass valve which opens the filter clogs, the engine oil pressure will continue to drop as the filter stops up and until the by-pass valve opens.

The converter by-pass check valve 525, being set for 4 p.s.i., will open if the converter inlet pressure exceeds the converter outlet pressure by 4 p.s.i. or more, and will supply a pressure above the piston 152 of the modulating valve 150 which is not less than 4 p.s.i. lower than the pressure delivered to the underside of piston 152. The restricted orifice 145 prevents loss of this pressure through the converter outlet drain orifices 140, 142. Any increase in the converter outlet pressure which reduces the difference to less than 4 p.s.i., however will seat the check valve 525, whereafter the action of the modulating valve will be controlled according to the respective effective areas and pressures above and below piston 152, causing the valve to modulate the pressure in the main line 418 in response to the torque ratio of the converter. The check valve 525 has two important functions: (1) When the engine is started, the oil immediately flows from the pump through the filter and under piston 152, but it takes an appreciable time, which may amount to a few seconds, to flow through the converter and through pressure delivery line 144 to the chamber 146 above the piston 152. During this time period, the modulated pressure in the main line 418 would be very low if means were not provided to compensate for such delay, and if the driver should attempt to shift the transmission and start the car there would not be sufficient pressure for proper operation. Under such conditions however, the check valve 525 opens immediately, supplying pressure above the piston 152 and urging the modulating valve downwardly with sufficient force to supply enough pressure in the main line for immediate operation. The fluid thus supplied also quickly increases the pressure in the converter, so that the converter outlet pressure can take over almost immediately and close the check valve; (2) without the check valve 525, the modulated pressure valve 150 would under certain conditions be unstable for the reason that as the modulated pressure builds up in the main line and under the piston 474, it tends to cause the valve to rise and to open the port beneath spool 460 wider, thereby reducing the modulated pressure. This should immediately stop the valve from rising further than just enough to maintain a given pressure, for ideal operation, but when the valve spool 460 cracked open under such conditions, a pressure surge would result which would quickly pass through the filter and to the underside of the piston 152, thereby causing the valve to rise still further despite the fact that the modulated pressure was still falling. Thus the modulating pressure would drop still further and the valve would thereby be carried considerably above the desired position for stable operation. Vibration of the valve would result, with conforming fluctuations of pressure in the main line. Although such pressure surges would also pass through the converter, they would reach the space above piston 152 somewhat later, causing the delayed closing of the port. The modulated pressure would thereby fall below normal, and the cycle would repeat. With the check valve 525 in the system however, any pressure surge does not have to pass through the converter but may unseat the check valve and immediately reach the top of the piston 152. This together with the damping effect of the orifices 476, 504 and 145, eliminates vibration of the modulating valve.

If with the engine idling the pump output pressure is not sufficient to open the modulating valve and allow oil to pass beneath the spool 460, oil flows through the orifice 477 and reaches the engine lubricating system and converter, but the restriction represented by orifice 477 is enough to maintain a minimum pressure (e.g. 40 p.s.i.) in the main line, which is sufficient to operate the low speed brake servo motor and disengage such brake.

Reduced pressure in the intake manifold, communicated to the chamber 526, also tends to lift the modulating valve and reduce the pressure in the main line through the connections previously described, and by virtue of the fact that the more nearly closed the throttle setting may be in proportion to engine speed, the higher the vacuum in the intake manifold, light throttle operation also, by influencing the modulating valve in an upward direction, reduces the pressure in the main line and thereby reduces the pressure in the servo motors and direct drive clutch.

When the selector valve 315 is moved from the low speed position to the drive position, pressure is conducted to the space behind piston 62 through the connections previously described to engage the direct drive clutch, and pressure is also conducted to the low speed servo motor cylinder 334 to release the low speed brake band 35, but the fluid to the low speed servo motor must pass through the restricted port 442. In my preferred embodiment, the parts are so proportioned that at about 20 p.s.i., the force of clutch retractor spring 396 is overcome and the clutch plates move into light engagement, but slip until, at approximately 35 p.s.i., the force of the low speed brake spring 320 is overcome, a delay being interposed at this point due to the restriction 442 so that the clutch takes the driving load before the low speed brake is released. Thus the restricted port 442 is important not only for its timing function but because it allows the clutch to continue to full operative engagement while the low speed brake piston continues its upward travel to allow band 35 to move to good running clearance from the drum. Release of the brake occurs during the very initial movement of the brake piston 335 and if it were not for the restriction at port 442, the pressure would remain at a reduced value (approximately 35 p.s.i.) until the brake piston reached the end of its travel. Inasmuch as such pressure is not enough for full clutch engagement, the direct drive clutch could not pick up the load, under such conditions, until piston 335 reached the end of its travel to permit a full build up of pressure in the system.

The connection between vacuum cylinder 328 and the intake manifold through conduit 333, as previously described, also assists in insuring proper timing of such a shift from low to direct drive. Increased vacuum assists the oil pressure in overcoming spring 320 and releasing the low speed brake. At engine idle the oil pressure is lowest, but the vacuum is at its highest. Therefore a very much lower oil pressure at idle is required than would be necessary without the vacuum connection to the low speed brake servo. Also by reason of the fact that the vacuum is high at low throttle, the band tends to release sooner at light throttle settings than at greater throttle settings. At heavier throttle where the clutch requires more pressure to engage, the brake band 35 accordingly releases later, allowing sufficient time to build up the necessary engagement pressure in the direct drive clutch at the wider throttle openings, when greater torque is being handled through the transmission.

With the torque multiplication obtainable with modern torque converters and a fairly high horsepower/weight ratio, good performance is obtainable without manual shifting and with the transmission output shaft 42 directly connected to the propeller shaft. However, increased torque multiplication and/or an overdrive effect can be obtained by connecting an overdrive unit as 250 between the transmission output shaft and the propeller shaft and, if desired, adjusting the rear axle ratio accordingly, as noted above.

The manner in which my improved system is effective to regulate the pressure in the servo motors in accordance with torque load can be illustrated by reference to data which I have derived from a transmission constructed in accordance with the present invention. In such transmission, the modulating valve spring 151 had a force of 10 lbs., the area of piston 474 was .196 sq. in., the area of the upper side of piston 152 was .601 sq. in., and the effective area of the underside of piston 152 was .405 sq. in. The effective area of the vacuum piston 523 was .736 sq. in., and the area of the pin 534 was .0123 sq. in. The converter inlet pressure was set at 43 p.s.i. The converter outlet pressure at maximum torque ratio of the converter reached 48 p.s.i. The converter outlet pressure at the point of engagement of the direct drive clutch was 38 p.s.i. Vacuum effect at light throttle was 9.7 p.s.i.

With the values as stipulated, under light throttle driving conditions, the forces acting to control the modulating valve 150 at the time of engagement of the direct drive clutch were as follows: The downward force on piston 152 was 22.8 lbs. (.601 sq. in.×38 lbs.). The upward force on piston 152 was 17.4 lbs. (.405 sq. in.×43 lbs.). The net downward force on piston 152 due to oil pressure was therefore 5.4 lbs. which added to the spring force of 10 lbs. gives a net downward force of 15.4 lbs. Subtracting from this the upward force due to vacuum, amounting to 7.1 lbs. (.736 sq. in.×9.7) gives an upward force of 8.3 lbs. From the vacuum-derived force the fluid pressure on the pin 534 must be subtracted, amounting to approximately .5 lb. (.0123 sq. in.×50 p.s.i.). The total downward effect upon the modulating valve under such conditions was therefore 8.8 lbs. The total downward force divided by .196 (area spool 474) determines the modulated pressure, which, under the stated conditions, gives a pressure of 45 p.s.i. in the main line, and which is effective to engage the clutch and release the brake band 35 at light throttle.

Under fast driving conditions at full throttle (no torque multiplication in converter and vacuum negligible) the net downward force acting on the modulating valve would comprise the fluid pressure of 5.4 lbs. and the spring force of 10 lbs. totaling 15.4 lbs. on top of the piston 152. This, divided by the effective upward area of .196 sq. in. results in the development of 78.5 p.s.i. in the main line, which is adequate to properly engage the clutch or hold the clutch in engagement and carry the torque under such conditions.

Under the conditions obtaining during a full throttle start (full torque multiplication in the torque converter, vacuum negligible) the net downward force on the modulating valve amounts to approximately 21.4 lbs., which comprises, in addition to the 10 lbs. spring force the output pressure of the torque converter (48 lbs.×.601 sq. in. or 28.8 lbs.) and an upward force of 17.4 lbs. acting beneath the piston 152. The resulting pressure equals 21.4 lbs. divided by .196 sq. in. or 110 p.s.i., which is available for clutch engagement under such conditions.

With the transmission constructed as thus far described, if a rigid connection is provided between the shift lever (conventionally mounted on the steering column, and not illustrated herein) and the arm 306 rockable thereby, it may not be possible to release the forward-neutral-reverse clutch means by moving the sleeve 70 forwardly from the park position, if the car is stopped on a hill and the engine is not running. It is only necessary to restart the engine while the hand lever is in the parked position, however, to automatically release the band 35 and permit the hand lever to be shifted to the neutral and driving positions. Inasmuch as, due to habit, some drivers hesitate to start an engine except when the shift lever is set in the neutral position, a resilient lost motion connection can be provided between the hand shift lever and the arm 306 if desired, to permit the shift lever to be moved to the neutral position by the driver. As soon as the engine is started, the resultant release of brake band 35 will relieve the torque between the clutch teeth 260, 275 and permit the sleeve 70 to move to the neutral position.

Modification of FIGURES 13–16

FIGS. 13–16 show the changed features of a modified construction wherein the low speed brake band is biased off, and is applied by fluid pressure, rather than disengaged by fluid pressure as in the embodiment just above described. The arrangement of the principal components of the transmission mechanism and the control system may correspond to those of the first embodiment, and analogous parts are designated by like reference numerals distinguished by the addition of the letter "a." The means for actuating the low speed brake band 35a, instead of being constructed as in FIG. 4 may be constructed as shown in FIG. 13. The band is biased off by a retracting spring 550 which bears downwardly against the longer arm of the brake applying lever 344a. The lever is pivoted upon a pin 345a and its long arm extends away from the actuating bracket 340a of the band. A lug 347a formed on the lever is connected through a link 346a to the bracket 340a so that when the lever 344a is lifted by the piston 335a of the servo motor 334a, the band is clamped on the drum 64a.

Fluid is delivered to the servo motor 334a through a conduit 360a, the valving arrangement being modified so that oil is only delivered to the servo when the low speed band is to be engaged rather than when it is to be disengaged. Such a valving arrangement is disclosed in FIG. 18 and will be considered in connection with other modified features disclosed in that view, although it will be appreciated that the valving arrangement is subject to modification in this regard and that the valve might be constructed in a manner more analogous to the valve 315 of the first embodiment but with the porting arranged to conduct fluid to the low speed servo motor rather than drain the low speed servo motor when the selector valve is in the low speed position.

A foot pedal 552 is also provided convenient to the driver and which may be located in the position commonly occupied by the clutch pedal of cars having conventional transmissions. The foot pedal 552 is pivoted upon pin 554 and articulated to the lever 344a by a link 555 so that when the pedal is depressed, the band 35a grips the drum 64a. Lost motion may be incorporated in the connection between the pedal and lever 344a, such a lost motion connection being indicated at 556, so the pedal will not be actuated by the servo motor.

The inner surface of the drum 64a is provided with a plurality of teeth 558. A latch dog 560 having a latch tooth 562 is swingable to engage and disengage the teeth 558, the dog being fast upon a shaft 564 transversely pivoted in and projecting from the transmission case portion 90a and carrying fast upon its projecting end an arm 565 which is connected by a link 566 to the shaft 308a which carries the shift lever 306a fast thereupon. Lever 306a is rockable similarly to the lever 306 of the first embodiment to move the forward-neutral-reverse toothed clutch (not shown) and to move the selector valve, which is fragmentarily illustrated at 315a. The lower end of the link 566 is connected to the rock shaft 308a and lever 306a by a lever 568 and the proportioning of the link and its connected parts is such that the dog tooth 562 can only engage the drum teeth 558 when the lever 306a is moved to the park position. The upper end of the link 566 projects slidably through a fitting 570 which is rotatably mounted in the end of the arm 565 for rotation about an axis parallel to the axis of shaft 564. The rod is also provided at its upper end with a head 572 which overlies the fitting 570. Spacedly below the fitting 570, the rod carries an abutment 586 fast thereupon, and a helical compression spring 590 is provided on the rod between fitting 570 and abutment 586 so that when the link is urged upwardly by the arm 568 the toothed end of the dog is urged upwardly by the spring, but the dog tooth is not positively forced into engagement with the drum teeth, although when the link is pulled down, the head 572 provides positive means for pulling the dog free. The sides of the dog tooth 562 and drum teeth 358 are inclined at such angles that if the drum is rotating above a very low speed, the dog will ratchet and not engage. The spring 590 permits such ratcheting and the slope of the contact angle of the ratchet teeth also permits disengagement of the dog under load with relatively light force. The spring 590 also permits the selector control lever to be moved to the park position even if one of the drum teeth is aligned with the dog tooth so that the latter cannot mesh, or even if the drum is rotating fast enough to cause ratcheting. As soon as the drum slows down sufficiently, or any slight car movement occurs, in such circumstances, however, one of the tooth spaces of the drum will, of course, align with the ratchet tooth and the latter will snap into engagement under the influence of the spring. The force of detent 316a is strong enough to cause the selector valve lever 306a to remain in the park position against the force of spring 590. It will be remembered that when the lever 306a is in the park position, the clutch sleeve 70 is in its rearmost position and the drum 64 is accordingly directly coupled to the output shaft. The dog accordingly acts as a parking brake of the latch type.

In order to start the car by pushing or towing, the shifter is moved to the low speed position and the driver depresses the foot pedal 552. Under such circumstances the clutch sleeve 70 couples the output shaft to the planet carrier and low gear is rendered effective by foot pedal actuation of the low speed band, so that the engine is cranked through the low gear drive.

Another advantage of this embodiment is that the foot pedal acts as an emergency brake which is independent of the brake system of the car, so that if the brake system should fail, the pedal 552 can be used, due to the fact that with the transmission in the drive position the drum 64a rotates with the driven shaft. In the drive setting, therefore, the brake band 35 acts as a propeller shaft brake which is directly actuatable by the foot pedal.

*Modification of FIGURE 17*

In the further modification shown in FIG. 17, the shift pattern is modified by the addition of one further position, located at but beyond the low speed end of the shift pattern. The shift pattern would then be E, L, D, N, R, P. The construction otherwise corresponds to that of the embodiment just previously described except that the arm which connects the lower end of the dog actuating link to the shift lever is attached at such an angle that the braking dog is engaged with the drum teeth at both extremities of the shift pattern; that is, in the E position and in the P position, but not in any intermediate positions. In FIG. 17, parts corresponding to those previously described are designated by like reference numerals distinguished by the letter "b" and as there shown, the arm 568b lies at approximately the same angle to the link 566b in the park or P position and in the emergency or E position, the dog being engaged at such times, while the arm swings downwardly when the shift lever 306b is moved away from either such extreme position, thereby disengaging the latch dog.

To start the car by pushing or towing, the driver would shift the control lever to the E position. In such position, the clutch sleeve 70 will be in the forward position in which the planet carrier is coupled to the output shaft, and with the ring gear held by the latch member, low gear is effective for cranking the engine. At the other extreme end of the movement of the control lever, which is the P position, the clutch sleeve 70 is in its rear position in which the ring gear and low speed brake drum are keyed to the output shaft, and the engagement of the latch with the drum teeth accordingly provides a latch-type parking brake.

It will also be appreciated that the latch dog could be operated by a separate control lever or handle located in a position convenient to the driver, so that the dog could be mechanically urged into engagement at the will of the driver. For a push start, the driver would shift the main shift control lever to L and move the latch control to urge the latch into the engaged position. For park, the driver would shift the main shift lever to P and move the latch control handle to urge the latch to the engaged position.

*Modification of FIGURES 18–22*

In FIG. 18, I have shown a modified control system for use with a transmission incorporating a low speed brake which is applicable by fluid pressure, as in the construction shown in FIGS. 13–16, but with no such foot pedal or other supplemental means for actuating the low speed band, and wherein a latch-type brake is provided corresponding to that shown in FIGS. 14–16. The control system is so modified that it is not necessary either to provide an additional controlling member or an additional position or setting for the main shift control, the shift pattern remaining as in the first embodiment. Again parts corresponding to components previously described are designated by like reference characters, but the letter "d" is added.

A hydraulically actuatable piston 600 is provided reciprocable in a cylinder 602 and having a rod 604 rigidly projecting therefrom, the rod being movable in a path which intersects the path of the latch dog 560d in such manner that when the piston and rod are moved downwardly by fluid pressure supplied to cylinder 602, the latch dog cannot engage the drum teeth 558d, whereas when the fluid pressure is relieved in the cylinder 602, the latch dog is engageable, in the same manner as in the second described embodiment, when the link 566d is moved upwardly. In this embodiment however, the arm 568d is connected to the shaft 308d to lie parallel to the rod when the shift lever 306d is in the N position and is of such length that the latch is urged into engagement when, and only when, the shifter is moved to the L position or to the P position. A spring 590d is also employed to permit such shift settings to be made even though the latch teeth might butt.

The selector valve 315d is somewhat modified in construction, and supplemental valving means is provided comprising a "high-low" valve generally designated 606, a low to high timing valve, generally designated 608, and a latch interlock drain valve 610. A pressure modulating system is provided as in the first embodiment, and the other transmission and control components, not specifically described herein, may and preferably do correspond to those disclosed in connection with the first described embodiment.

The modulated pressure supply is delivered to the selector valve inlet port 420d through the main line 418d. When the selector valve is in neutral, as shown in FIG. 18, the modulated pressure can only enter the latch interlock servo cylinder 602, being sealed from all other servos by the two lands 612, 614 of the selector valve. The fluid is delivered from the selector valve inlet port 420d past the valve neck 615 to a port 616 which is connected by a conduit 618 to the cylinder 602.

When the selector valve is shifted from neutral to the drive position shown in FIG. 19, the left-hand spool 612 uncovers a port 622 connected by a passage 624 to the inlet port 625 of the high low valve 606. The high low valve will remain in the left-hand position under the influence of its biasing spring 628. The modulated pressure fluid can then enter the line 400d leading to the direct drive clutch servo. The direct drive clutch accordingly engages at the modulated pressure, and the vehicle may then be started in high gear through the torque converter by opening the throttle. Fluid is also admitted from the high low valve through a port 630 and a conduit 632 to a chamber 634 at the right end of the low to high timing valve 608. It will be observed that the right-hand spool 635 is larger than the left-hand spool 636 of this valve. The left end chamber 638 of the valve 608 is directly connected to the main line 418d by a branch conduit 640, and it will be seen that under these conditions both ends of the valve casing are subjected to modulated pressure, and the valve 608 is accordingly moved to the left. Such movement of the low to high timing valve 608 has no significance at this time however because the intermediate ports of such valve are not connected to a pressure source.

If the selector valve 315d is moved farther to the left to the L position shown in FIG. 20, the left-hand spool 612 of the selector valve uncovers a port 642 connected by a conduit 644 to the chamber 645 at the left end of the high low valve chamber. Conduit 644 is also connected to an intermediate port 646 of the low to high timing valve 608 so that when fluid is supplied to the line 644, it also increases the effective left end area of the low to high timing valve, so that the effect of the modulated pressure upon such valve becomes balanced. The high low valve 606 is then moved to the right, connecting the port 630 and line 400d to a drain port 648 of the high low valve and connecting the supply line 624 to a port 650 to which the conduit 360d leading to the low speed brake servo is connected. The central spool 652 of the high-low valve 606 is narrower than the central port 625, which defines an enlarged chamber. When the valve is in the left position such chamber is isolated from the low speed port 650, and when the valve is in the right position, the chamber is isolated from the port 630. When the valve 606 is in an intermediate position, the spool 652, being centered in the chamber 625, establishes communication between the supply line 624 and both of the conduits 360d, 400d. When the valve is in the left position, the right spool 654 isolates the clutch supply port 630 from the drain port 648, while the left-hand spool 655 uncovers a drain port 656 to drain the low speed servo motor. After the high-low valve moves to the right to cause engagement of the low speed brake as outlined above, the clutch line 400d is drained through the port 648, and the right end of the timing valve 608 is also vented permitting the timing valve to move to the right under the influence of the modulated pressure reacting on the left end of the timing valve. Chamber 645 remains connected to the pressure source however so that the high-low valve 606 is held at the right.

If the selector valve 315d is then shifted from low to drive, the port 642 connected to the left end chamber 645 of the high low valve 606 will be closed off and a drain port 660 which is connected to the side of the chamber of valve 606 spacedly to the right of chamber 645 is vented to the sump through the open left end 424d of the selector valve. The spacing of the spools and ports of the high low valve 606 is such that when the left end of the left spool 655 thereof reaches the left extremity of port 660, the central spool 652 is centered in the central valve chamber 625, and it will be seen that the opening of the line 662 connected to the port 660 and the closure of the port 642 by the selector valve spool 612 permits the high-low valve to move to the left, under the influence of its spring 628, until the spool 655 reaches the left edge of the port 660. Thereafter the fluid in the chamber 645 and connected line 644 is trapped and arrests further leftward movement of the high-low valve 606, which then remains in the intermediate position. With the high-low valve in this central position, modulated pressure is maintained in the low speed brake servo, while such pressure is also delivered through line 400d to the direct drive clutch servo cylinder. As the pressure builds up to engage the direct drive clutch it also reacts upon the right end of the low to high timing valve 608, and at a pressure somewhat below the modulated pressure which is reacting upon the opposite end of this valve, will force valve 608 to the left. The left end spool 636 of the timing valve then uncovers a port 664 which is spaced closer to port 646 than the spacing of spools 635—636. Port 664 communicates through a conduit 665 with the chamber of the selector valve 315d near the left end thereof, so that with the selector valve in the drive position, line 665 is vented through the left end opening of the selector valve. Movement of the timing valve 608 to the left position accordingly vents the chamber 645 at the left end of the high low valve through the left end of the selector valve, releasing the trapped oil from the left end of the high low valve and allowing the latter valve to move to the left under the influence of its spring 628. Such movement of the high low valve vents the low speed servo supply line 360d through drain port 656 and isolates the low speed servo system from the supply line 624, maintaining the pressure in the direct drive clutch and permitting continued operation of the vehicle in the direct drive. As the modulated pressure reacts upon the smaller diameter spool 636 of the timing valve 608, release of the low speed brake will occur when the engagement pressure of the direct drive clutch reaches a relatively low value when the modulated pressure is low, which is the case with low transmission input torque, and release of the low speed brake will occur at proportionately higher pressures when the engagement pressure of the direct drive clutch is higher, as is the case with higher transmission input torques. By properly proportioning the diameters of the spools of the timing valve 608, the low speed brake can be made to release at the point at which the direct drive clutch will take over the drive, regardless of the transmission input torque.

When the selector valve is shifted from drive to neutral, the port 622 is opened through the left end opening 424d, draining the direct drive clutch. The low speed brake servo is still drained through the high low valve port 656, and with the valve in the neutral position the modulated pressure can only enter port 616 leading to the latch brake interlock servo cylinder 692, being sealed from all other servos by the spools 612, 614 of the selector valve. Such movement of the selector valve also places the shiftable clutch sleeve 70 in the neutral position as previously explained, and the interlock plunger 604 prevents engagement of the dog 560d as long as oil pressure is supplied, so that the output shaft is disengaged at the sliding clutch sleeve 70 and drum 64 and ring gear 33 are also free.

With the selector valve in neutral, drive, or low, the conduit 366d to the reverse brake servo motor is drained through the right end opening 425d of the selector valve, as in the first embodiment, while when the selector valve is placed in the reverse position the drain port 446d for the reverse servo conduit is sealed by the spool 614 and the restricted supply port 448d for the reverse servo is connected to the modulated pressure supply, being then uncovered by the spool 614. Reverse drive is then instituted as in the first embodiment.

Similarly when the selector is moved all the way to the right to the park position, the port 448d is vented through a drain port 437d, which is then uncovered by the spool 614. Spool 612 is then slightly to the left of port 616 so that both the reverse brake servo motor and the latch interlock servo cylinder 602 are then drained through the port 437d, the other servo motors also remaining vented. The position of the lever 568d is, in the park setting, also such as to urge the latch tooth 562d into engagement with the latch teeth 558d, and such engagement is permitted by the freeing of the latch interlock plunger 604. Thus as soon as the movement of the vehicle is slow enough to permit latch brake engagement, the parking latch brake becomes effective, clutch sleeve 70 then being in the rearmost position, as explained previously.

It will be observed that when the control lever is in the other extreme position, which is the low position, the latch 560d is also urged into engagement. If the engine is running however, modulated pressure is conducted from the conduit 624 through a branch conduit 670 and past a ball check valve 672 into the conduit 618 which leads to the interlock cylinder 602. Thus the plunger is effective to prevent engagement of the latch brake in the low gear setting when the engine is running, and the brake band 35d functions in the normal manner to apply braking force to the drum whenever its servo motor is energized. The ball check valve 672 traps the oil in the interlock cylinder 602, preventing release of the interlock during the period while the low speed brake servo motor cylinder is filling with oil. During this period the modulated pressure might be so low that it would not be sufficient to effect an interlock, as this might be at the time when the engine is idling.

To start the vehicle by pushing or towing, since the engine is not running, no modulated pressure will be supplied to the interlock cylinder 602. For such a start the driver shifts to the low speed setting, and this will engage the latch tooth, thereby holding the ring gear stationary and placing the transmission in the low gear drive. As soon as the engine starts, the modulated pressure will be delivered to the interlock cylinder past the check valve 672, as explained above. The pressure thus supplied to the interlock cylinder may force the latch tooth out of engagement, but if the torque reaction is too great so that fluid cannot release the latch, no harm will be done, because when the driver thereafter shifts to the drive position, the head 572d will pull the latch dog out of engagement as the rod 566d is drawn downwardly.

The latch interlock drain valve 610 comprises a piston valve having a head portion, which, at its left end, is exposed to the modulated pressure, the cylinder portion 674 of such valve being in direct communication with the modulated pressure line 418d, as shown in FIG. 18. Whenever the engine is running, the piston is held to the right, as shown in FIG. 18, against the effort of the spring 675, and at such time the skirt portion 676 of the piston closes a vent port 677 which provides communication between the conduit 618 and the cylinder 674. When there is no modulating pressure, as when the engine is stopped, the piston moves to the left and skirt 676 uncovers port 677 which then communicates with a drain orifice 678 through which the latch interlock cylinder is vented whenever the engine is not running. This insures engagement of the latch brake so that low gear is operative to start the vehicle by pushing or towing when desired.

While it will be apparent that the preferred embodiments of the invention herein described are well calculated to fulfill the objects and advantages first above stated, it will be appreciated that the invention is susceptible to variation, modification and change without departing from the fair meaning and proper scope of the appended claims.

I claim:

1. In a power transmission system including a torque transmitting device of the hydrodynamic type and additional engageable and disengageable friction-type torque transmitting means, an actuator for frictionally engaging said last-named means, said device having operating components, a casing enclosing said components and having an inlet and an outlet, means restricting the outlet relatively to the inlet sufficiently so that the outlet pressure may rise above the inlet pressure to a material degree, and means responsive to variations of pressure in the casing at the outlet of said device for regulating the engaging pressure applied to said friction-type torque transmitting means by said actuator.

2. In a power transmission system including a hydrodynamic torque transmitting device and clutchable means of the friction type, a servo motor for actuating said means, said device being of the circulating type and having a fluid inlet and a fluid outlet, means for supplying fluid under pressure to said device and to said servo motor, means restricting the flow of fluid from the outlet of said device, means responsive to variations of the pressure differential between the inlet and the outlet of said device for regulating the pressure of fluid delivered to said servo motor, and means for maintaining the pressure of said inlet fluid substantially constant.

3. In a power transmission system including a hydrodynamic torque transmitting device and clutchable means of the friction type, a servo motor for actuating said means, said device being of the circulating type and having a fluid inlet and a fluid outlet, means for supplying fluid under preessure to said device and to said servo motor, including means restricting the flow of fluid from the outlet of said device, means responsive to the pressure of fluid in the outlet of said device for regulating the pressure of fluid delivered to said servo motor, said regulating means also being influenced by the pressure of fluid delivered to the inlet of said device, means for maintaining the pressure of said inlet fluid substantially constant, said regulating means comprising a hydraulically displaceable member movable in one direction under the outlet pressure and in the opposite direction under the inlet pressure, and one way acting means for applying inlet pressure upon said member in the same direction as outlet pressure when the inlet pressure exceeds a predetermined proportionate value with respect to the outlet pressure.

4. In combination with an internal combustion engine and a power transmission system including a hydrodynamic torque transmitting device and clutchable means of the friction type, a servo motor for actuating said means, said device being of the circulating type and having a fluid inlet and a fluid outlet, means restricting said outlet sufficiently to permit a materially higher pressure to exist at the outlet than at the inlet, means for supplying fluid under presure to the inlet of said device and to said servo motor, means responsive to changes of pressure differential between the inlet and outlet of said device for regulating the action of said servo motor, and means responsive to the relative torque demand upon the engine for modifying the action of said regulating means.

5. In a power transmission system including a hydraulic torque converter having a fluid inlet and a fluid outlet, means restricting the outlet relatively to the inlet so that the pressure in the converter at the outlet can rise above the pressure at the inlet and whereby pressure variations occur within the torque converter which are related to the torque multiplication of such torque converter, friction-type clutching means, an actuator for said last-named means, and means responsive to variations of the pressure in said torque converter for regulating the actuating pressure applied to said clutching means by said actuator.

6. In a power transmission system including a hydraulic torque converter having a fluid inlet and a fluid outlet, means restricting the outlet relatively to the inlet so that the pressure in the converter at the outlet can rise above the pressure at the inlet and whereby pressure variations occur within the torque converter which are related to the torque multiplication of such torque converter, friction-type clutching means, an actuator for said last-named means, and means responsive to changes in the pressure in said torque converter outlet in a range above the inlet pressure and corresponding to an increase in torque multiplication for increasing the actuating pressure applied to said clutching means by said actuator.

7. In a power transmission system as defined in claim 6 adapted for use in a vehicle, in conjunction with an engine for driving the vehicle through the torque converter, means responsive to increased relative torque demand upon the engine and also tending to increase the pressure applied to said clutching means.

8. In a power transmission system including a hydrodynamic torque transmitting device having a fluid inlet and a fluid outlet, means restricting the outlet relatively to the inlet so that the pressure in said device at the outlet can rise above the inlet and whereby pressure variances occur within said device in proportion to the torque ratio transmitted thereby, friction power transmitting means for controlling the transmission of torque through said system, an actuator for said friction means, a source of fluid under pressure, and means responsive to variations of the pressure in said hydrodynamic device for regulating the engaging pressure applied to said friction means by said actuator including a pressure fluid supply system connected to the source and to said actuator for controllingly actuating the latter, and a pressure modulating valve connected to said pressure fluid supply system and to said hydrodynamic device for varying the pressure of the fluid in said supply system.

9. In a power transmission system including a hydrodynamic torque transmitting device within which pressure variances occur in proportion to the torque ratio transmitted thereby, friction power transmitting means for controlling the transmission of torque through said system, an actuator for said friction means, a source of fluid under pressure, and means responsive to the pressure in said hydrodynamic device for regulating the engaging pressure applied to said friction means by said actuator including a pressure fluid supply system connected to the source and to said actuator for controllingly actuating the latter, a pressure modulating valve connected to said pressure fluid supply system and to said hydrodynamic device for varying the pressure of the fluid in said supply system, said hydrodynamic device having an inlet and an outlet communicating with an external fluid circulating system, restricting means regulating the escape of fluid from said hydrodynamic device, means for regulating the pressure of fluid admitted to said hydrodynamic device through said inlet, and means including a restricted orifice connecting said modulating valve to said outlet between said outlet and said restricting means, said modulating valve including a hydrostatic actuating chamber and a displaceable member within said chamber, said outlet being connected to said chamber on one side of said displaceable member.

10. In a power transmission system including a hydrodynamic torque transmitting device within which pressure variances occur in proportion to the torque ratio transmitted thereby, friction power transmitting means for controlling the transmission of torque through said system, an actuator for said friction means, a source of fluid under pressure, and means responsive to the pressure in said hydrodynamic device for regulating the engaging pressure applied to said friction means by said actuator including a pressure fluid supply system connected to the source and to said actuator for controllingly actuating the latter, a pressure modulating valve connected to said pressure fluid supply system and to said hydrodynamic device for varying the pressure of the fluid in said supply system, said hydrodynamic device having an inlet and an outlet communicating with an external fluid circulating system, restricting means regulating the escape of fluid from said hydrodynamic device, means for regulating the pressure of fluid admitted to said hydrodynamic device through said inlet, means including a restricted orifice connecting said modulating valve to said outlet between said outlet and said restricting means, said modulating valve including a hydrostatic actuating chamber and a displaceable member within said chamber, said outlet being connected to said chamber on one side of said displaceable member, and means including a restricted orifice connecting said chamber on the other side of said displaceable member to said inlet.

11. In a power transmission system including a hydrodynamic torque transmitting device within which pressure variances occur in proportion to the torque ratio transmitted thereby, friction power transmitting means for controlling the transmission of torque through said system, an actuator for said friction means, a source of fluid under pressure, and means responsive to the pressure in said hydrodynamic device for regulating the engaging pressure applied to said friction means by said actuator including a pressure fluid supply system connected to the source and to said actuator for controllingly actuating the latter, a pressure modulating valve connected to said pressure fluid supply system and to said hydrodynamic device for varying the pressure of the fluid in said supply system, said hydrodynamic device having an inlet and an outlet communicating with an external fluid circulating system, means for regulating the pressure of fluid admitted to said hydrodynamic device through said inlet, said modulating valve including a hydrostatic actuating chamber, a displaceable member within said chamber, said outlet being connected to said chamber on one side of said displaceable member, means including a restricted orifice connecting said chamber on the other side of said displaceable member to said inlet, and means including a valve biased against inlet pressure providing a connection between said inlet and the same side of the chamber to which the outlet is connected, whereby both ends of said chamber may be connected to the inlet when the inlet pressure exceeds the outlet pressure by a predetermined amount.

12. In a power transmission system including a hydrodynamic torque transmitting device within which pressure variances occur in proportion to the torque ratio transmitted thereby, friction power transmitting means for controlling the transmission of torque through said system, an actuator for said friction means, and means responsive to variations of the pressure in said hydrodynamic device for regulating the engaging pressure applied to said friction means by said actuator including a pressure fluid supply system connected to the actuator for controllingly actuating the same, and a pressure modulating valve connected to said pressure fluid supply system and to said hydrodynamic device for varying the pressure of the fluid in said supply system, said modulating valve being urged in a pressure increasing direction by increase of pressure in said hydrodynamic device and being urged in a pressure decreasing direction by fluid pressure in said supply system.

13. In a power transmission system including a hydrodynamic torque transmitting device within which pressure variances occur in proportion to the torque transmitted thereby, friction power transmitting means for controlling the transmission of torque through said system, an actuator for said friction means, a source of fluid under pressure, and means responsive to the pressure in said hydrodynamic device for regulating the engaging pressure applied to said friction means by said actuator including a pressure fluid supply system connected to the source and to said actuator for controllingly actuating the latter, a pressure modulating valve connected to said pressure fluid supply system and to said hydrodynamic device for varying the pressure of the fluid in said supply system, means for regulating the pressure of fluid admitted to said hydrodynamic device, an oil filter having an inlet and an outlet, the outlet of the filter being connected to, and arranged to supply fluid to, the inlet of the hydrodynamic device, said source being connected to said filter inlet, said means for regulating the pressure of the fluid delivered to the inlet of the torque converter including a relief valve in communication with the inlet of the filter, and means responsive to the pressure of fluid which has passed through the filter for actuating said relief valve.

14. An engine-transmission assembly including in combination with an engine having a forced feed oil lubrication system, a hydrodynamic drive member having an external oil circulating system and having an oil inlet and an oil outlet communicating with said system, and additional transmission components including a rotatable member and a bearing journaling said rotatable member, and also including a hydrostatically operable device, an integrated oiling system for lubricating said engine and bearing and also for controlling said hydrostatically operable device and for supplying oil to said hydrodynamic drive member, comprising a pump drivable by the engine, an oil filter having an inlet connected to the outlet of the pump and having an outlet connected to said engine lubrication system and to the inlet of said hydrodynamic member, means for controlling the pressure of the oil delivered from the outlet of the filter, means for delivering oil from said filter outlet to said bearing for lubricating the latter, means connecting said pump outlet to said hydrostatically operable device, and pressure modulating means connected to the outlet of said hydrodynamic member for controlling the pressure of fluid delivered to said hydrostatically operable device.

15. An engine-transmission assembly including in combination with an engine having a forced feed oil lubrication system, a hydrodynamic drive member having an external oil circulating system and having an oil inlet and an oil outlet communicating with said system, and additional transmission components including a rotatable member and a bearing journaling said rotatable member, and also including a hydrostatically operable device, an integrated oiling system for lubricating said engine and bearing and also for controlling said hydrostatically operable device and for supplying oil to said hydrodynamic drive member, comprising a pump drivable by the engine, an oil filter having an inlet connected to the outlet of the pump and having an outlet connected to said engine lubrication system and to the inlet of said hydrodynamic member, means for controlling the pressure of the oil delivered from the outlet of the filter, means for delivering oil from said filter outlet to said bearing for lubricating the latter, means connecting said pump outlet to said hydrostatically operable device, pressure modulating means connected to the outlet of said hydrodynamic member for controlling the pressure of fluid delivered to said hydrostatically operable device, said means for controlling the pressure of the oil delivered from the filter outlet comprising pressure relief valve connected to the inlet of the filter, and means responsive to the pressure in the filter outlet for actuating said relief valve.

16. An engine-transmission assembly including in combination with an engine having a forced feed oil lubrication system, a hydrodynamic drive member having an external oil circulating system and having an oil inlet and an oil outlet communicating with said system, and additional transmission components including a rotatable member and a bearing journaling said rotatable member, and also including a hydrostatically operable device, an integrated oiling system for lubricating said engine and bearing and also for controlling said hydrostatically operable device and for supplying oil to said hydrodynamic drive member, comprising a pump drivable by the engine, an oil filter having an inlet conected to the outlet of the pump and having an outlet connected to said engine lubrication system and to the inlet of said hydrodynamic member, means for controlling the pressure of the oil delivered from the outlet of the filter, means for delivering oil from said filter outlet to said bearing for lubricating the latter, means connecting said pump outlet to said hydrostatically operable device, pressure modulating means connected to the outlet of said hydrodynamic member for controlling the pressure of fluid delivered to said hydrostatically operable device, and means responsive to the relative torque demand upon the engine for modifying the action of said pressure modulating means.

17. An engine-transmission assembly including in combination with an engine having a forced feed oil lubrication system, a hydrodynamic drive member having an external oil circulating system and having an oil inlet and an oil outlet communicating with said system, and additional transmission components including a rotatable member and a bearing journaling said rotatable member, and also including a hydrostatically operable device, an integrated oiling system for lubricating said engine and bearing and also for controlling said hydrostatically operable device and for supplying oil to said hydrodynamic drive member, comprising a pump drivable by the engine, an oil filter having an inlet connected to the outlet of the pump and having an outlet connected to said engine lubrication system and to the inlet of said hydrodynamic member, means for controlling the pressure of the oil delivered from the outlet to the filter, means for delivering oil from said filter outlet to said bearing for lubricating the latter, means connecting said pump outlet to said hydrostatically operable device, pressure modulating means connected to the outlet of said hydrodynamic member for controlling the pressure of fluid delivered to said hydrostatically operable device, said modulating means including a valve urged in a direction to increase the pressure of fluid delivered to said hydrostatically operable device in response to increase of pressure in said hydrodynamic member, means reacting in response to pump pressure to move said modulating valve in the opposite direction, and means including a restricted feed portion providing constant communication between said pump outlet and said filter inlet.

18. In an engine-transmission assembly including an engine lubricating system, a hydraulic torque converter having a fluid inlet connected to said supply system and having an outlet, a filter having an outlet connected to said system and having an inlet, a pump having an outlet connected to said filter inlet, means for regulating the pressure of oil delivered to said system and to said converter inlet comprising a regulating valve communicating with said filter inlet and means responsive to the pressure in the filter outlet and substantially independent of the pressure in the filter inlet for actuating said valve and constituting the sole actuating means for said valve, drive controlling means, pressure actuatable means for actuating said controlling means, means connecting said pressure actuatable means to said pump, and means responsive to operating conditions obtaining in said torque converter for varying the pressure of fluid delivered to said pressure actuatable means.

19. In an engine-transmission assembly including an engine lubricating system, a hydraulic torque converter having an oil inlet connected to said system and having an outlet, a filter having an outlet connected to said system and having an inlet, a pump having an outlet connected to said filter inlet, means for regulating the pressure of oil delivered to said system and to said converter inlet comprising a regulating valve communicating with said filter inlet and means responsive to the pressure in the filter outlet for actuating said valve and constituting the sole actuating means for said valve, drive controlling means, pressure actuatable means for actuating said controlling means, means connecting said pressure actuatable means to said pump, and means responsive to operating conditions obtaining in the engine and in said torque converter for varying the pressure of fluid delivered to said pressure actuatable means.

20. An engine-transmission system comprising an engine having an oil sump, a transmission having another oil sump, means including a pump and a supply passage for supplying oil to both the engine and the transmission, and means for maintaining desired oil level in both of said sumps including portions defining at least two separate vertically spaced passages of communication between said sumps, said two passages of communication being distinct from said previously mentioned passages.

21. An engine-transmission system comprising an engine having an oil sump, a transmission having another oil sump, means including a pump for supplying oil to both the engine and the transmission, and means for maintaining desired oil level in both of said sumps including pump inlet defining portions connecting said pump to a lower portion of both of said sumps, and separate communicating portions providing connection between upper portions of said two sumps.

22. An engine-transmission system comprising an engine having a pressure lubricating oiling system and a power output portion, an oil-operable hydrodynamic torque transmitting unit having a power input portion connected to the engine power output portion and having a power output portion, a further oil-operable torque transmitting component having a power input connected to the power output portion of said hydrodynamic unit and having a power output to which a torque load is adapted to be connected, means for supplying oil under pressure to said oiling system and to said torque transmitting unit and to said torque transmitting component, means for maintaining substantially constant oil pressure in said means for supplying oil to said oiling system and to said torque transmitting unit, torque sensing means for varying the pressure of oil delivered to said torque transmitting component in general conformity to changes in relative torque load, said hydrodynamic unit having an oil inlet and an oil outlet, the outlet being sufficiently restricted relatively to the inlet to enable maintenance of a materially higher pressure within said unit in the vicinity of the outlet than at the inlet, and the torque sensing means being influenced by variations of the pressure differential between said oil inlet and oil outlet.

23. An engine-transmission system comprising an engine having a pressure lubricating oiling system and a power output portion, an oil-operable hydrodynamic torque transmitting unit having a power input portion connected to the engine power output portion and having a power output portion, a further oil-operable torque transmitting component having a power input connected to the power output portion of said hydrodynamic unit and having a power output to which a torque load is adapted to be connected, means for supplying oil under pressure to said oiling system and to said torque transmitting unit and to said torque transmitting component, means for maintaining substantially constant oil pressure in said means for supplying oil to said oiling system and to said torque transmitting unit, torque sensing means for varying the pressure of oil delivered to said torque transmitting component in general conformity to changes in relative torque load, said unit comprising a hydraulic torque converter having an oil inlet and an oil outlet, and the torque sensing means being influenced by variations of pressure differential between said oil inlet and oil outlet.

24. In an engine-transmission system including an engine having an oil sump, a transmission having an oil sump, said transmission being mounted adjacent to and drivable by the engine, said engine having a pressure lubricating oiling system and said transmission having oil-operated components, said lubricating system having return portions communicating with said engine sump and said oil-operated components having discharge portions communicating with said transmission sump, an oil pump for supplying oil both to said lubricating system and to said components and having an inlet, said oil pump inlet being connected to both of said sumps, a float valve preventing said pump from drawing oil from one of said sumps when the oil level in such sump is below a predetermined minimum, and valving means opposing the drawing of oil simultaneously from both of said sumps by said pump.

25. In an engine-transmission system including an engine having an oil sump, a transmission having an oil sump, said transmission being mounted adjacent to and drivable by the engine, said engine having a pressure lubricating oiling system and said transmission having oil-operated components, said lubricating system having return portions communicating with said engine sump and said oil-operated components having discharge portions communicating with said transmission sump, an oil pump for supplying oil both to said lubricating system and to said components and having an inlet, said oil pump inlet being connected to both of said sumps, a float valve preventing said pump from drawing oil from one of said sumps when the oil level in such sump is below a predetermined minimum, and valving means opposing the drawing of oil from the other of said sumps, said valving means comprising a valve arranged between said other sump and said pump inlet and biased against the flow of oil from said other sump to said pump.

26. In an engine-transmission system including an engine having an oil sump, a transmission having an oil sump, said transmission being mounted adjacent to and drivable by the engine, said engine having a pressure lubricating oiling system and said transmission having oil-operated components, said lubricating system having return portions communicating with said engine sump and said oil-operated components having discharge portions communicating with said transmission sump, an oil pump for supplying oil both to said lubricating system and to said components and having an inlet, said oil pump inlet being connected to both of said sumps, a float valve preventing said pump from drawing oil from one of said sumps when the oil level in such sump is below a predetermined minimum, valving means opposing the drawing of oil from the other of said sumps by said pump, and means including a gravity flow passage portion providing communication between said two sumps and located substantially at the maximum oil level in both sumps.

27. In an engine-transmission system including an engine having an oil sump, a transmission having an oil sump, said transmission being mounted adjacent to and drivable by the engine, said engine having a pressure lubricating oiling system and said transmission having oil-operated components, said lubricating system having return portions communicating with said engine sump and said oil-operated components having discharge portions communicating with said transmission sump, an oil pump for supplying oil both to said lubricating system and to said components and having an inlet, said oil pump inlet being connected to both of said sumps, a float valve preventing said pump from drawing oil from one of said sumps when the oil level in such sump is below a predetermined minimum, valving means opposing the drawing of oil from the other of said sumps by said pump, means including a gravity flow passage portion providing communication between said two sumps and located substantially at the maximum oil level in both sumps, and means also providing communication between said sumps above the oil level, to equalize the air pressure in said sumps.

28. In a motor and power transmission assembly including a motor and a hydrodynamic torque transmitting device drivable by the motor and having an oil inlet and an oil outlet which is restricted relatively to the inlet, said motor also having an oil sump and components which require lubrication by substantially unconfined lubricant, in combination with an oil pump drivable by the motor for delivering oil from said sump to said inlet, means for delivering oil from said outlet to such components.

29. In a power transmission system including a torque transmitting device of the hydrodynamic type and additional engageable and disengageable torque transmitting means, an actuator for said last named means, said device having hydrodynamic operating components, a casing enclosing said components, an inlet portion leading into said casing to said components and an outlet portion leading from said components out of said casing, means restricting the outlet portion with respect to the inlet portion, and means responsive to variations of pressure existing in said casing between said components and said restricting means for regulating the action of said actuator.

30. In a power transmitting system including a hydrodynamic torque transmitting device and actuatable means of the friction type, servo motor for actuating said means, said device being of the circulating type and having a fluid inlet and a fluid outlet, means for supplying fluid under pressure to said device and to said servo motor, means restricting the outlet of said device relatively to the inlet, and means responsive to variations of the pressure differential between the inlet and outlet of said device for regulating the pressure of fluid delivered to said servo motor.

References Cited in the file of this patent

UNITED STATES PATENTS

| Number | Name | Date |
|---|---|---|
| 1,902,050 | Vincent | Mar. 21, 1933 |
| 2,077,580 | Patterson | Apr. 20, 1937 |
| 2,149,117 | Dodge | Feb. 28, 1939 |
| 2,182,621 | Dodge | Dec. 5, 1939 |
| 2,400,964 | Vincent et al. | May 28, 1946 |
| 2,442,840 | Carnagua | June 8, 1948 |
| 2,461,218 | Lapsley | Feb. 8, 1949 |
| 2,536,663 | Schoer | Jan. 2, 1951 |
| 2,541,391 | Weiss et al. | Feb. 13, 1951 |
| 2,557,421 | Evernden | June 19, 1951 |
| 2,568,007 | Jandasek | Sept. 18, 1951 |
| 2,576,336 | Farkas | Nov. 27, 1951 |
| 2,584,965 | McFarland | Feb. 5, 1952 |
| 2,603,984 | Swift | July 22, 1952 |
| 2,606,461 | Herndon | Aug. 12, 1952 |
| 2,623,411 | Herndon | Dec. 30, 1952 |
| 2,625,056 | Kelley | Jan. 13, 1953 |
| 2,640,373 | Jandasek | June 2, 1953 |
| 2,645,137 | Roche | July 14, 1953 |
| 2,715,343 | Youngren et al. | Aug. 16, 1955 |
| 2,722,296 | Stoeckicht | Nov. 1, 1955 |
| 2,737,824 | Livermore | Mar. 13, 1956 |
| 2,747,431 | Roche | May 29, 1956 |
| 2,750,018 | Dundore | June 12, 1956 |
| 2,757,552 | English | Aug. 7, 1956 |
| 2,821,095 | Kelley | Jan. 28, 1958 |

UNITED STATES PATENT OFFICE
CERTIFICATE OF CORRECTION

Patent No. 3,038,353                          June 12, 1962

Clifton R. Roche

It is hereby certified that error appears in the above numbered patent requiring correction and that the said Letters Patent should read as corrected below.

Column 4, line 21, for "transmission" read -- transmissions --; column 6, line 34, for "partion" read -- partition --; column 9, line 34, for "tthrough" read -- through --; column 16, line 9, for "port", first occurrence, read -- ports --; column 19, line 23, after "opens" insert -- when --; column 31, line 68, for "conected" read -- connected --; column 32, line 22, for "to" read -- of --.

Signed and sealed this 11th day of December 1962.

(SEAL)
Attest:

ERNEST W. SWIDER                           DAVID L. LADD
Attesting Officer                              Commissioner of Patents